US008091102B2

(12) United States Patent
Hon et al.

(10) Patent No.: US 8,091,102 B2
(45) Date of Patent: Jan. 3, 2012

(54) METHODS AND SYSTEMS THAT MOTIVATE TUNING TO A TRANSMISSION CHANNEL FOR A TIME PERIOD

(75) Inventors: Gilbert Y. M. Hon, Hong Kong (CN); Sam C. S. Yu, Hong Kong (CN); Mike H. P. Tsui, Hong Kong (CN); Brian Fife, Hong Kong (CN)

(73) Assignee: United Video Properties, Inc., Los Angeles, CA (US)

( * ) Notice: Subject to any disclaimer, the term of this patent is extended or adjusted under 35 U.S.C. 154(b) by 937 days.

(21) Appl. No.: 11/958,443

(22) Filed: Dec. 18, 2007

(65) Prior Publication Data

US 2009/0158311 A1 Jun. 18, 2009

(51) Int. Cl.
*H04N 60/33* (2006.01)
*H04N 60/56* (2006.01)

(52) U.S. Cl. .................... 725/23; 725/9; 725/10; 725/14

(58) Field of Classification Search ................. 725/9–24
See application file for complete search history.

(56) References Cited

U.S. PATENT DOCUMENTS 5,614,940 A * 3/1997 Cobbley et al. ............... 725/138
5,716,273 A 2/1998 Yuen
5,774,664 A * 6/1998 Hidary et al. ................. 725/110
6,057,872 A 5/2000 Candelore
7,213,254 B2 * 5/2007 Koplar et ........................ 725/23
2001/0029610 A1 10/2001 Corvin et al.
2001/0054181 A1 12/2001 Corvin
2002/0144260 A1 * 10/2002 Devara ............................ 725/32

FOREIGN PATENT DOCUMENTS

EP 1 564 993 8/2005
WO WO 2005/025220 3/2005
WO WO 2007/086704 8/2007

OTHER PUBLICATIONS

Heidi Dawley, "New, Ads in Movies That You Can't Zap", Technology Inserts Ads in Films Downloaded from Web, Dec. 6, 2007.
O'malley, "YouTube's Ad Model Lets Users Vote on Ads", AdAge.com, Aug. 22, 2006.
"Streaming Video, Free Video on CNN.com", printed from the Internet on Jul. 9, 2007, http://www.cnn.com/services/advertise/video_streaming.html.

* cited by examiner

*Primary Examiner* — Hunter Lonsberry
(74) *Attorney, Agent, or Firm* — Ropes & Gray LLP

(57) ABSTRACT

Systems and methods are provided for motivating a user to watch a television channel for a predetermined period of time and enabling access to a media asset related to a program provided on the channel. A tuner is tuned to a transmission channel and a program is received concurrently with a portion of a media asset. The viewing behavior is monitored to determine whether the user tunes to a different transmission channel before a predetermined time period elapses. When the user tunes to a different transmission channel before the predetermined time period elapses, access to the media asset is prevented. When the user stays tuned to the particular transmission channel for the predetermined time period, access to the media asset is enabled. The media asset may be transmitted to a portable user device, such as a mobile phone.

27 Claims, 14 Drawing Sheets

1400

700

900

METHODS AND SYSTEMS THAT MOTIVATE TUNING TO A TRANSMISSION CHANNEL FOR A TIME PERIOD

BACKGROUND OF THE INVENTION

This application relates to interactive media guidance applications and more particularly to the transmission of media assets over the transmission channel of a television program. As defined herein, transmission channel refers to, in the analog domain, the frequency of an analog communications link through which transmissions from a particular television station is delivered and, in the digital domain, the portion of the digital modulation data in a communications link that corresponds to the transmissions of a particular television station.

Television viewers sometimes view a television program transmitted over a particular channel only when the actual program related content (as opposed to a commercial or advertisement) is displayed. That is, the viewers sometimes tune away to other channels during commercial breaks that occur intermittently when the program is broadcast. Such behavior may lessen the value of commercials (or commercial breaks) to advertisers. Consequently, advertisement spots may become less desirable when there is no guarantee that they will be experienced by the end users.

Prior systems attempt to increase the desirability of advertisement spots by allowing the user to receive or download media content from some other source only after the user cycles through a collection of advertisements in a program guide. However, these systems reduce the entertainment value of the television viewing experience by imposing a burden upon the user to continuously view multiple advertisements, one after another. Forcing the user to view advertisements in such a manner may be less desirable to the user than viewing advertisements intermittently during commercial breaks of a particular television program.

There is no mechanism by which to provide effective advertising to a user while preserving the entertainment value of the television viewing experience.

SUMMARY OF THE INVENTION

In view of the foregoing, there is a need to provide systems and methods for motivating the user to watch a television channel for a predetermined period of time while preserving the television viewing experience.

Accordingly, systems and methods are provided for motivating a viewer to watch a television channel for a predetermined period of time. In particular, media assets which the user desires are provided to the user concurrently with the entertainment (e.g., a television program) provided by a particular transmission channel while he/she enjoys the entertainment provided by the channel and experiences intermittent commercial breaks. After a particular period of time that the user is tuned to the transmission channel, the received media assets are enabled for access. Thus, the user is motivated to stay tuned to the particular transmission channel (in anticipation of having access to media assets enabled) which increases the desirability of advertisement spots to advertisers while preserving the user's television viewing experience (e.g., by allowing the user to view television programming).

In some embodiments, a user tunes to a transmission channel to receive a television program. A media asset related to a television program is divided at a broadcast source into multiple portions of equal or unequal sizes and the portions are transmitted over the transmission channel concurrently with the television program. As defined herein, an asset or media asset refers to any type of media that may be played or accessed on a user device (e.g., television equipment, mobile device such as a phone or a PDA, or a computer). Such media may include all the variants of television media, music media, interactive games, and other audio and/or video media. Each asset may be associated with an identifier that identifies an aspect (e.g., name or title) of the asset. For example, the related media assets of a television program discussing top five music videos may include either the music files (e.g., MP3 files) or video files of the specific top five music videos being discussed. The bandwidth of the transmission channel may be limited in size. Accordingly, the division of the media asset into multiple portions allows the broadcast source to insert the portions into the transmission channel when the bandwidth becomes available.

For example, a particular television program or portion thereof may consume a larger part of the bandwidth than a different program. A bandwidth monitor may detect the size difference of the television program or the amount of space consumed by the television program and determine that some portion of the bandwidth becomes available. In particular, where one program portion consumes the entire bandwidth, no bandwidth is available for insertion of a media asset portion. But, where another portion of the program consumes half of the bandwidth (e.g., because the program is smaller in data size), the other half of the bandwidth is available for insertion of a media asset portion. Alternatively, some programs have data (e.g., closed-caption data) that is transmitted during some portions and not others of the programs and when transmitted the data consumes a portion of the bandwidth. Thus, when the data is not being transmitted, that part of the bandwidth becomes available for the insertion of a media asset portion.

The activity at the user television equipment is monitored to determine whether the user tunes to a different transmission channel before the predetermined time period elapses. In one implementation, monitor circuitry polls the tuner to determine whether the channel, through which the media asset portions are received, is the channel to which the tuner is tuned. The monitor circuitry polls the tuner at various points in time throughout the predetermined time period. Thus, the system ensures that the user receives access to the media asset only if he/she stays tuned to a particular transmission channel without interruption (i.e., tuning to a different channel). Receiving access to the media asset, in turn, is a motivation for the user not to change transmission channels before the predetermined period of time elapses. Transmitting the media asset only over the transmission channel of the television program increases the value of commercial sports for advertisements and makes it unnecessary for the user to seek other sources to receive access to the media asset.

Along with the portion of the media asset, information is provided to the user television equipment indicating a duration and time of a predetermined time period. In one implementation, the predetermined time period is the length of time it takes to transmit and receive every portion of the media asset. In another implementation, the predetermined time period is the length or duration of a particular program. In another implementation, the predetermined time period, is the time during which commercials or advertisements are displayed for the user.

When it is determined that the user television equipment has been tuned to a different transmission channel before the predetermined time period has elapsed, access to the media asset is prevented. In one implementation, access to the media asset is prevented by removing from the memory of the user television equipment all of the previously stored/received portions of the media asset. In other implementations, access to the media asset may require codeword(s) to be applied that are provided to the user television equipment throughout the predetermined time period. If the codeword(s) is not correct or not entered access to the media asset is prevented. The codeword(s) may be a decryption key necessary to decrypt an encrypted media asset.

When it is determined that the user television equipment has not been tuned to a different transmission channel before the predetermined time period has elapsed, access to the media asset is enabled. For example, control circuitry may combine various media asset portions stored in the memory to reconstruct the media asset and thereby enable access to the media asset. In one implementation, the control circuitry may apply a codeword(s) to enable access to the media asset. The codeword(s) may be applied automatically by the user television equipment.

In some embodiments, the media asset may be transmitted from the user television equipment to a mobile user device. The user may access or playback the media asset on the mobile device. For example, the media asset may be a ringtone that is transmitted to a mobile phone. The user may select the media asset as the default ringtone of the mobile phone.

In some embodiments, at least one trigger is transmitted to the user television equipment at some point, unknown to the user, during the predetermined time period. The trigger may include information necessary to enable access to the media asset. Accordingly, in some scenarios in which all portions of the media asset are received at the user television equipment before the predetermined time period elapses, access is nevertheless prevented until the trigger(s) is/are received. For example, the media asset may be encrypted and the trigger(s) may be required to decrypt the media asset. The user must remain tuned to the transmission channel of the program until the trigger(s) is/are received for access to the media asset to be enabled.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION OF THE PREFERRED EMBODIMENTS

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a web-site), or as stand-alone applications or clients on hand-held computers, PDAs, mobile telephones, or other mobile devices. The various devices and platforms that may implement media guidance applications are described in more detail below.

Figure 1:
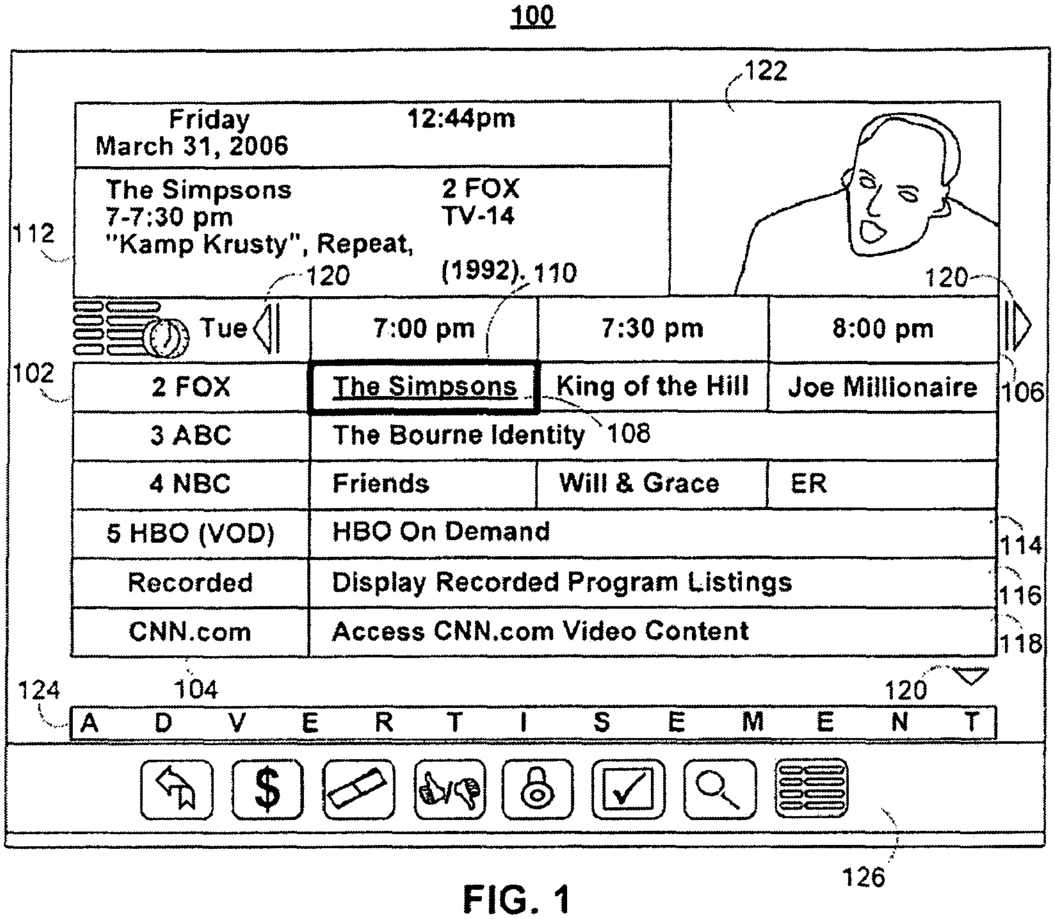
FIG. 1 shows an illustrative grid program listings display arranged by time and channel.
Figure 2:
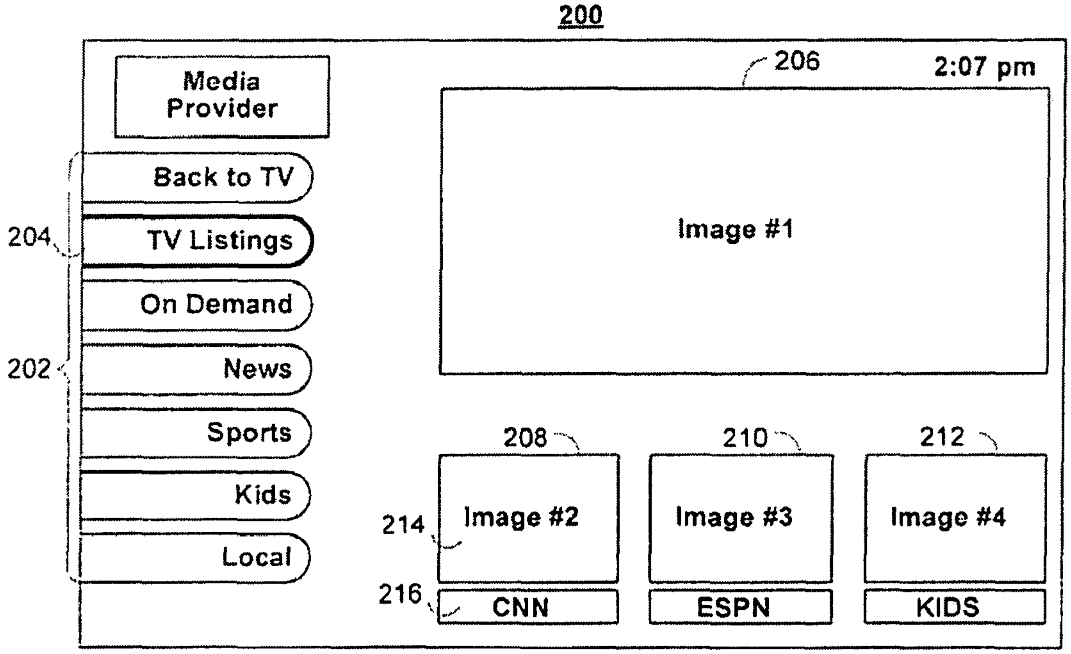
FIG. 2 shows another display arrangement for providing media guidance.

One of the functions of the media guidance application is to provide media listings and media information to users. FIGS. 1-2 show illustrative display screens that may be used to provide media guidance, and in particular media listings. The display screens shown in FIGS. 1-2 and 5-8 may be implemented on any suitable device or platform. While the displays of FIGS. 1-2 and 5-8 are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP).

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content. Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. Pat. No. 7,165,098, issued Jan. 16, 2007, and Ellis et al., U.S. patent application Ser. No. 10/105,128, filed Feb. 21, 2002, which are hereby incorporated by reference herein in their entireties.

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216. Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
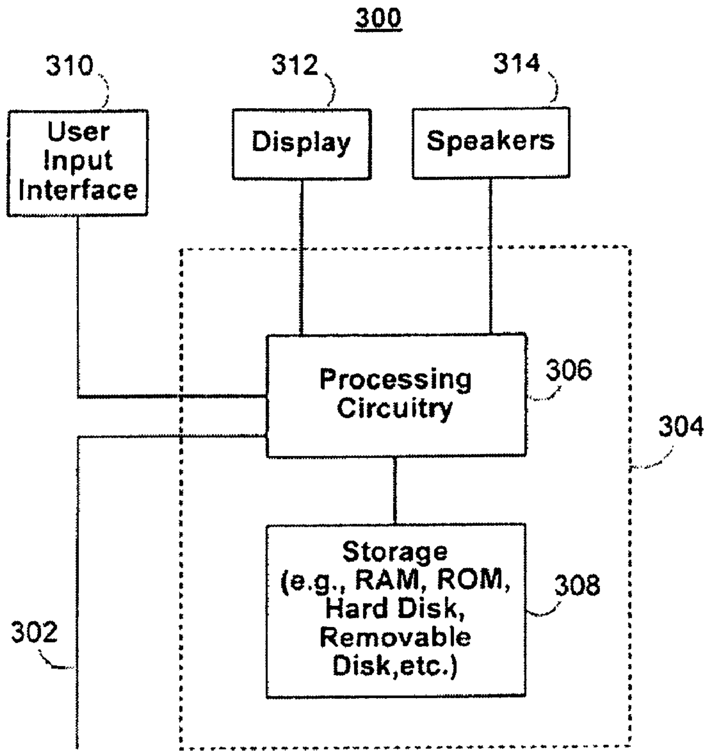
FIG. 3 shows a generalized embodiment of illustrative user equipment device.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIGS. 4 and 12. User equipment device 300 may receive media content and data via input/output (hereinafter "I/O") path 302. I/O path 302 may provide media content (e.g., broadcast programming, on-demand programming, Internet content, portions of media assets, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

As described in more detail below in connection with FIG. 12, control circuitry 304 may include at least one tuner and monitor circuitry. Control circuitry 304 may instruct the monitor circuitry to determine whether some criteria regarding a predetermined time period is met. For example, control circuitry 304 may instruct monitor circuitry to detect whether or when the tuner is tuned away from a particular transmission channel during a particular time frame (e.g., 9-10PM). During the predetermined time period, portions of a media asset may be received through the transmission channel and stored in memory 308. When the criteria is met and determined by the monitor circuitry, access to a media asset received over the transmission channel may be enabled.

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media and media assets described herein and guidance application data, including program information, guidance application settings, user preferences or profile information, or other data used in operating the guidance application. Nonvolatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting media into the preferred output format of the user equipment 300. Circuitry 304 may also include digital-to-analog converter circuitry and analog-to-digital converter circuitry for converting between digital and analog signals. Circuitry 304 may also include monitor circuitry for analyzing viewing habits to determining whether a transmission channel is viewed for a predetermined period of time. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 4:
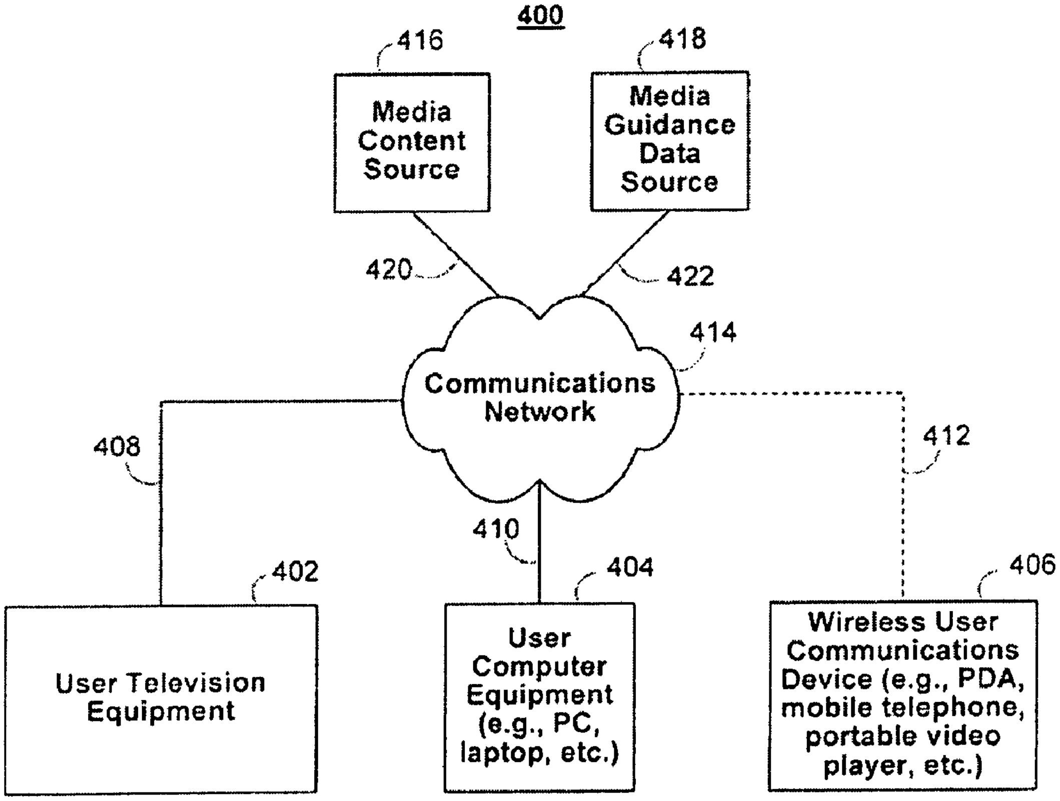
FIG. 4 shows a user equipment device being implemented in a system.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a standalone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAS, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may be the originator of media assets and may perform selections of which media assets are related to or associated with a particular television program. Media content source 416 may include circuitry for dividing a selected media asset into portions and transmitting those portions concurrently with a television program over link 420. Media content source 416 may include circuitry for monitoring the bandwidth of link 420 to determine when bandwidth becomes available for insertion of a media asset portion. Media content source 416 may include circuitry for determining and setting a predetermined time period during which the media asset portions are to be transmitted. Media content source 416 may also transmit, over link 420, triggers indicating the availability of media assets and including information about the predetermined time period and/or codeword(s) necessary to access the media assets.

Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely stored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, advertisement data structures, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices. In other embodiments, media guidance applications may be client-server applications where only the client resides on the user equipment device. For example, media guidance applications may be implemented partially as a client application on control circuitry 304 of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit media content. For example, a user may transmit media content from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

In some embodiments, media assets that are related to a television program being watched are provided to the user through the transmission channel of the television program. The system monitors the user's viewing habits to determine whether a particular transmission channel has been watched for a predetermined period of time. When the predetermined period of time has elapsed, access to a media asset related to the television program is enabled. In some aspects of the invention, the media asset can be downloaded or transmitted to a portable user device (e.g., a mobile phone or PDA) for access on the portable device.

It should be understood, that the user does not play a part in selecting which media asset he/she receives from the broadcast source. The selection of the media asset is performed by the broadcast source or some other third party source of media assets other than the user television equipment (or user thereof). The user may be informed about the media asset selection and may choose to satisfy a set of criteria for access to the media asset to be enabled. For example, the user may desire access to the media asset (selected by the broadcast source) and may be required to stay tuned to a particular transmission channel (i.e., the transmission channel providing the media asset) for a predetermined time period in order for access to the desired media asset to be enabled.

Figure 5:
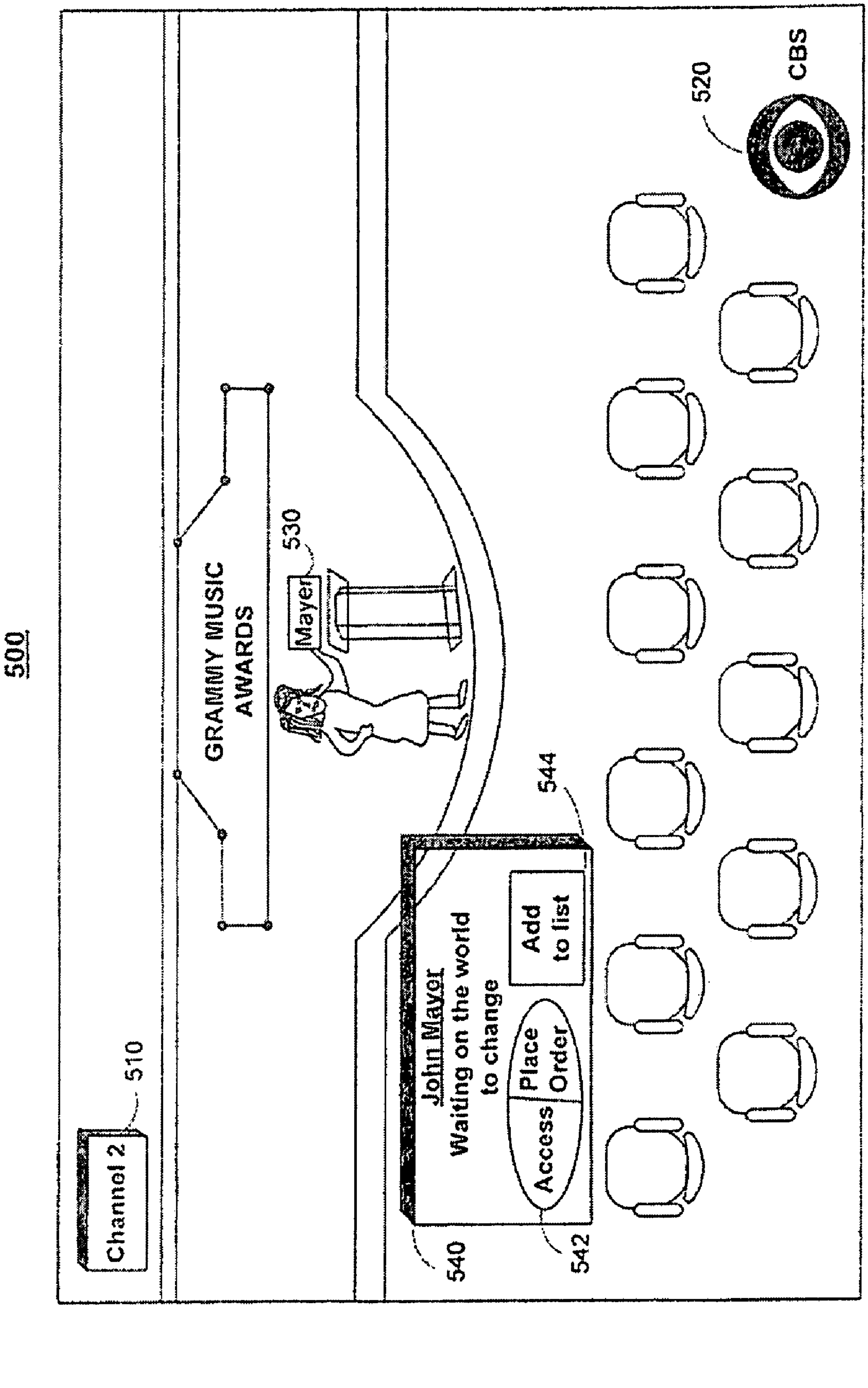
FIG. 5 shows a display of a notification indicating the availability of a media asset related to a television program in accordance with an embodiment of the present invention.

FIG. 5 shows a display 500 of a notification 540 indicating the availability of a media asset related to a television program in accordance with an embodiment of the present invention. As shown in display 500, the user is tuned to a transmission channel 510 (e.g., channel 2) which may be associated with a particular network 520 (e.g., CBS). The television program which is received over the transmission channel and displayed on a display device may be, for example, "Grammy Music Awards."

Throughout the broadcast of the television program, there may be commercial breaks. During the commercial breaks, the television program is stopped and advertisements are displayed for a particular time period (e.g., 5 minutes). In order to motivate a viewer to stay tuned to the channel 510 that is providing the television program, the broadcast source may enable access to a media asset only after a predetermined period of time elapses. It should be understood, that the selection of which media asset is transmitted over a transmission channel is performed at the broadcast source. In particular, the broadcast source determines which media assets are related to a television program and transmits those media assets with the television program. That is, the choice of media assets is made for the user at the broadcast source (i.e., media content source 416 (FIG. 4)) and the media asset is provided to the user concurrently with the television program. The user need only interact with one source (i.e., the source of the transmission channel) to have access to a particular media asset enabled. This ensures that the correct media asset is provided to the user with the proper rights as the broadcast source is the originator of the television program and can most appropriately perform the selection a related media asset to transmit to the user based.

At the start of the television program (or at some other point in time before the broadcast of the program), the network 520 or broadcast source of the television program may inform the user of the availability of a media asset that is related to the television program. For example, the network 520 or broadcast source may inform the user that for the television program, "Grammy Music Awards," access to media assets for music artists that are mentioned in the program may be enabled. However, the network 520 or broadcast source may inform the viewer that access to the media asset is enabled only if the viewer stays tuned to the channel 510 for a predetermined period of time, otherwise access is prevented.

In one implementation, access to the media asset is prevented by the use of access bits. For example, the media asset may include a sequence of bits where access to the media asset is prevented when the sequence of bits do not equal to the appropriate value (e.g., the media asset may include an access bit, where, when the bit is set, access is enabled and when the bit is cleared access is disabled). The access bits of the media asset may be changed to meet the appropriate value that is necessary for access by either the EPG implemented on the user television equipment or a signal transmitted by the broadcast source.

In some embodiments, the predetermined period of time may be the total duration of the television program being provided over the transmission channel. Thus, access to the media asset may be prevented, if the viewer tunes away from the television channel 510 to a different television channel (e.g., channel 5) at some point during the broadcast of the television program or whenever commercials are displayed.

In some other embodiments, the predetermined period of time may be a specified time period during which the television program is broadcast. For example, the predetermined time period during which the user must stay tuned to the television channel 510, may start several minutes into the program and end several minutes before the program ends. Alternatively, the predetermined time period may be measured only during the commercial breaks. For example, throughout the broadcast of a television program aired from 9-10PM, there may be two commercial breaks of, for example, 10 minutes each. The first commercial break may begin at 9:15PM and end at 9:25PM and the second commercial break may begin at 9:45PM and end at 9:55PM. Accordingly, the predetermined period of time may be measured from 9:15-9:25PM and from 9:45-9:55PM. Thus, if the viewer tunes to a transmission channel different from channel 510 during either of those periods of time (i.e., 9:15-9:25PM or from 9:45-9:55PM), then access to the media asset is prevented.

A monitor circuit that may be implemented on the user television equipment 402 (FIG. 4) (or some external device coupled to the tuner of the television channel 510). The monitor circuit may be configured to monitor this predetermined period of time. The monitor circuit and various other components used to determine whether access to the media asset should be enabled or prevented are discussed in more detail below in connection with the description of FIG. 12.

Portions of the media asset may be transmitted in the transmission channel 510 with the televised program during the predetermined time period. In particular, as discussed in more detail in connection with FIG. 9, the media asset may be divided and transmitted in multiple portions. This is because of the limited bandwidth that is available for the transmission of data concurrently with a television program. Thus, only when the necessary bandwidth becomes available in the transmission channel 510, during the predetermined broadcast interval, at least one portion of the multiple portions is transmitted with the television program.

Each of the portions is received by the television equipment device and stored in a memory. Once the television equipment device determines that the predetermined time period has elapsed and that the user stayed tuned to the transmission channel 510 without interruption (e.g., tuning to a different transmission channel), the received portions are combined and access to the media asset is enabled. It should be understood, that even if all of the portions of the media asset are received, access to the media asset may still be prevented if the predetermined time period has not elapsed. Thus, for very small media assets (e.g., single portion media assets), the viewer must still stay tuned to the transmission channel 510 until the predetermined period of time has elapsed. This enhances the effect of commercials and advertisements provided with the television program and ensures that the user receives access to the asset only if the user stays tuned to the necessary transmission channel 510 for the period of time.

Referring back to FIG. 5, after the predetermined period of time has elapsed and the viewer has stayed tuned to the same television channel 510, a notification 540 may be provided indicating that access to a media asset related to the television program is enabled or that the media asset is available. In some embodiments, the notification 540 may be provided after the system determines that every portion of the media asset has been received and successfully combined. In particular, as shown in display 500, an artist 530 (e.g., John Mayer) is mentioned in the television program that is being watched. A media asset, related to the artist 530 mentioned in the television program, may have been downloaded (to completion) to the user television equipment during the predetermined period of time. The media asset may be a song file (e.g., an MP3 file) of or associated with artist 530 mentioned in the television program.

The user may select an access option 542 in notification 540 to access the downloaded media asset. Alternatively, the user may select an add to media asset list option 544 in notification 544 to add the downloaded media asset to a stored listing of assets. A more detailed discussion of the stored listing of assets will be provided in connection with the description of FIG. 8.

In some embodiments, the downloaded media asset may be accessed after payment is received from the user. For example, the media asset may be encrypted or coded with some key. Once payment information is received for the access to the media asset, the key is provided to the user and can be used to unlock or decrypt the media asset. Once the media asset is unlocked or decrypted, access to the media asset is enabled.

Figure 6:
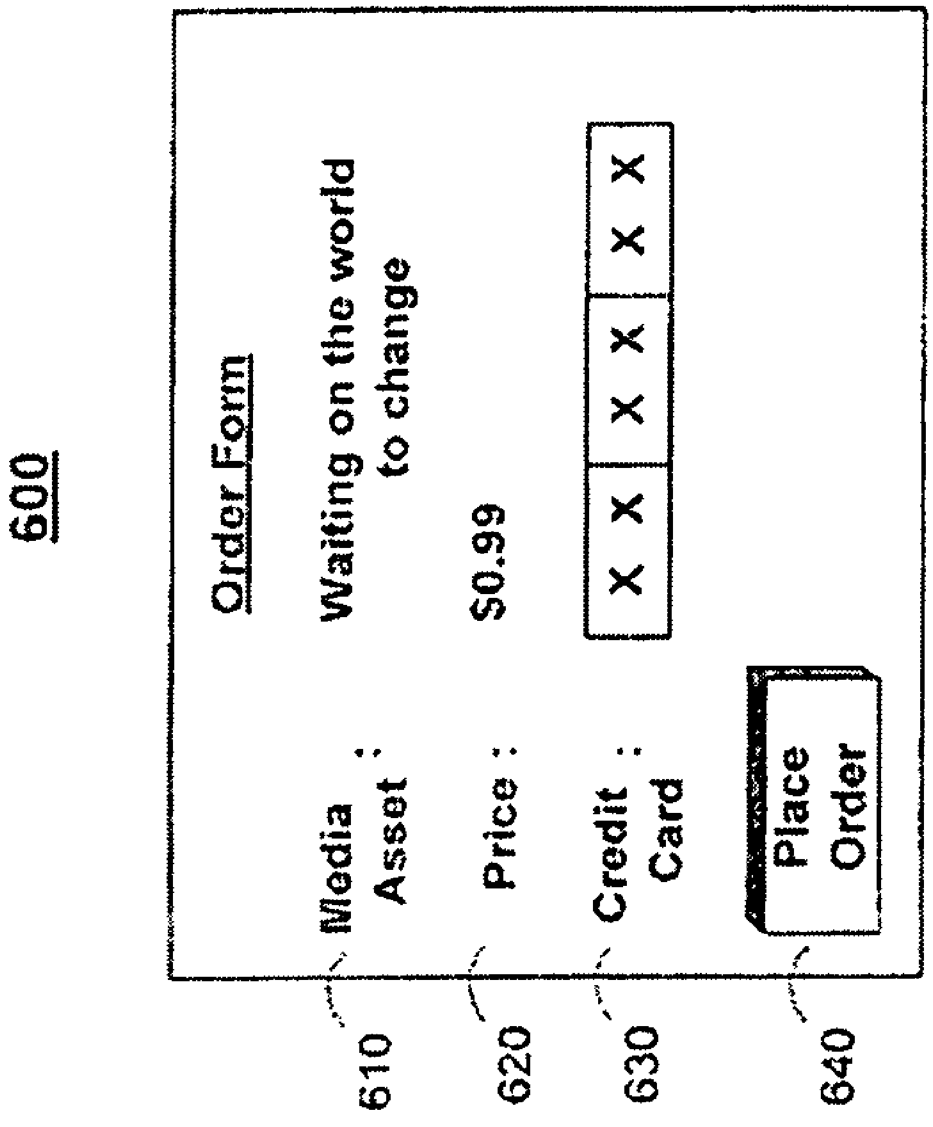
FIG. 6 shows a display of a media asset order form in accordance with an embodiment of the present invention.

For example, selection of access option 542 may provide the user with an order form 600 as shown in FIG. 6. After the user provides payment information to the broadcast source or some other party, access restrictions may be removed (e.g., a decryption key or unlock code may be provided and applied to the media asset) and access to the media asset may be enabled.

As shown in FIG. 6, an order form 600 may be presented and payment information is requested from the user for accessing the downloaded media asset. The order form 600 may include the title or name 610 of the media asset, the price 620 required for access to the media asset, payment field 630, and a place order option 640. The user may input payment information (e.g., credit card number) into payment field 630. After the user inputs the payment information into field 630, the user may select option 640 to have the payment information processed. The processing may involve transmission of the payment information to the broadcast source or other third party.

After the payment information has been processed, the user may be provided with a notification indicating the acceptance of the payment. Additionally, a key or some other code may be provided and the user television equipment may apply the key or code to unlock or remove any access restrictions from the media asset. Once the media asset is unlocked or decrypted, access to the media asset is enabled.

In some embodiments, a trigger may be provided in the transmission channel of the television program. The trigger may indicate the availability of a media asset to the user television equipment. In particular, instead of having the user television equipment determine when the predetermined time period elapses, the trigger may inform the user television equipment that the predetermined time period has elapsed and enable access to the media asset. In some aspects of the invention, the trigger may include a codeword associated with the media asset. The trigger may be transmitted at some point, unknown to the user, during the broadcast of the television program. Thus, the user must stay tuned to the transmission channel throughout the predetermined time period to ensure the receipt of the trigger. If the user television equipment does not receive the trigger, access to the media asset is prevented.

Figure 7:
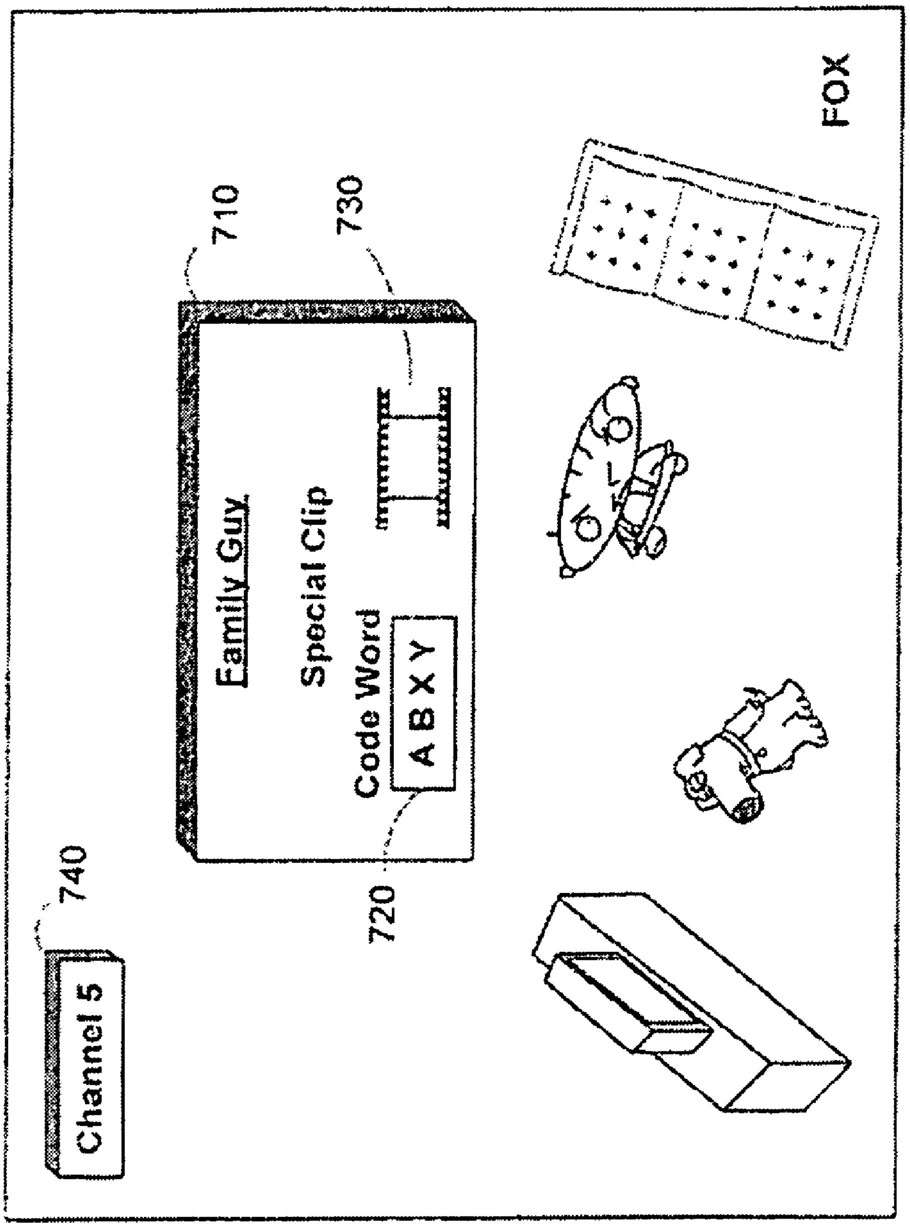
FIG. 7 shows a display of a notification indicating the availability of a media asset related to a television program in accordance with an embodiment of the present invention.

FIG. 7 shows a display 700 of a notification 710 indicating the availability of a media asset related to a television program in accordance with an embodiment of the present invention. Notification 710 may include a codeword 720 and an icon 730. Notification 710 may be displayed in response to the receipt of a trigger by the user television equipment.

In particular, at some point during a predetermined time period, unknown to the user, the trigger may be received with the television program over the transmission channel 740. In response to the trigger receipt, notification 710 may be displayed informing the user of the availability of the media asset. The user may be required to note codeword 720 that is associated with the media asset in order to subsequently have access to the media asset enabled. In some embodiments, multiple triggers may be received each providing a different codeword. When the user desires to access the media asset, the user television equipment may request the user to provide the codeword(s) 720 that are associated with the media asset. After the codeword(s) 720 is/are provided by the user, access to the media asset may be enabled. Thus, the user is required to stay tuned to the same transmission channel 5 throughout the predetermined time period to ensure that the user does not miss any trigger(s) and, in turn, codeword(s) necessary for access to the media asset to be enabled.

The trigger(s) may be programmed at the broadcast source to be transmitted only during commercial breaks. This ensures that the viewer is exposed to the advertisements provided during the commercial breaks. In particular, the user must view all of the advertisements during the commercial breaks to ensure that no triggers and codeword(s) are missed. Preferably, the user does not know the number of codewords that are associated with a media asset. Consequently, the user must stay tuned to the transmission channel for the entire duration of the predetermined time period (e.g., the length of the program) so as to ensure all of the codeword(s) and in effect trigger(s) are received.

In some embodiments, instead of requiring the user to manually note the codeword(s) associated with a trigger and media asset, the user television equipment may automatically store the codeword(s) that are received with the trigger(s). Thus, notification 710 may only be displayed when all of the triggers are received and in effect when the predetermined time period has elapsed. When the user desires to access the media asset, the user television equipment may automatically apply the codeword(s) to the media asset and enable access to the media asset.

In some aspects of the invention, payment information may be required for access to the media asset even though all of the triggers associated with the media asset have been received. When payment information is required, the user may be presented with display 600 (FIG. 6) requesting the user to input payment information to remove access restrictions. In some embodiments, the payment information may be previously stored, and display 600 may be a confirmation that the order has been placed upon the request of the user. This automates the payment process and expedites the enablement of access and removal of restrictions imposed on a particular media asset.

Icon 730 may be provided to inform the user of the type of media asset that is downloaded or provided. In particular, icon 730 may be a filmstrip indicating that the media asset is a video or movie, or a musical note indicating that the media asset is a music file or ringtone for a mobile phone. One skilled in the art will appreciate that other icons 730 may be provided indicating various types of files without departing from the scope and spirit of the invention. For example, a binary number icon may be provided indicating that a media asset is a data file or computer program.

The media asset may be added to a listing of assets (described in connection with FIG. 8) before or after access to the media asset is enabled. As described in more detail in connection with FIG. 8, the media asset may only become accessible after the appropriate number of triggers (and in turn codeword(s)) are received. It should be understood that the process of entering codeword(s) is merely illustrative and may be automated such that the triggers themselves are the codeword(s) which the user television equipment uses to determine whether access to the media asset should be enabled. That is, the user television equipment may automatically enable access to the media asset after receiving a predetermined number of triggers even though the actual triggers provide or include no codeword(s) related information.

Figure 8:
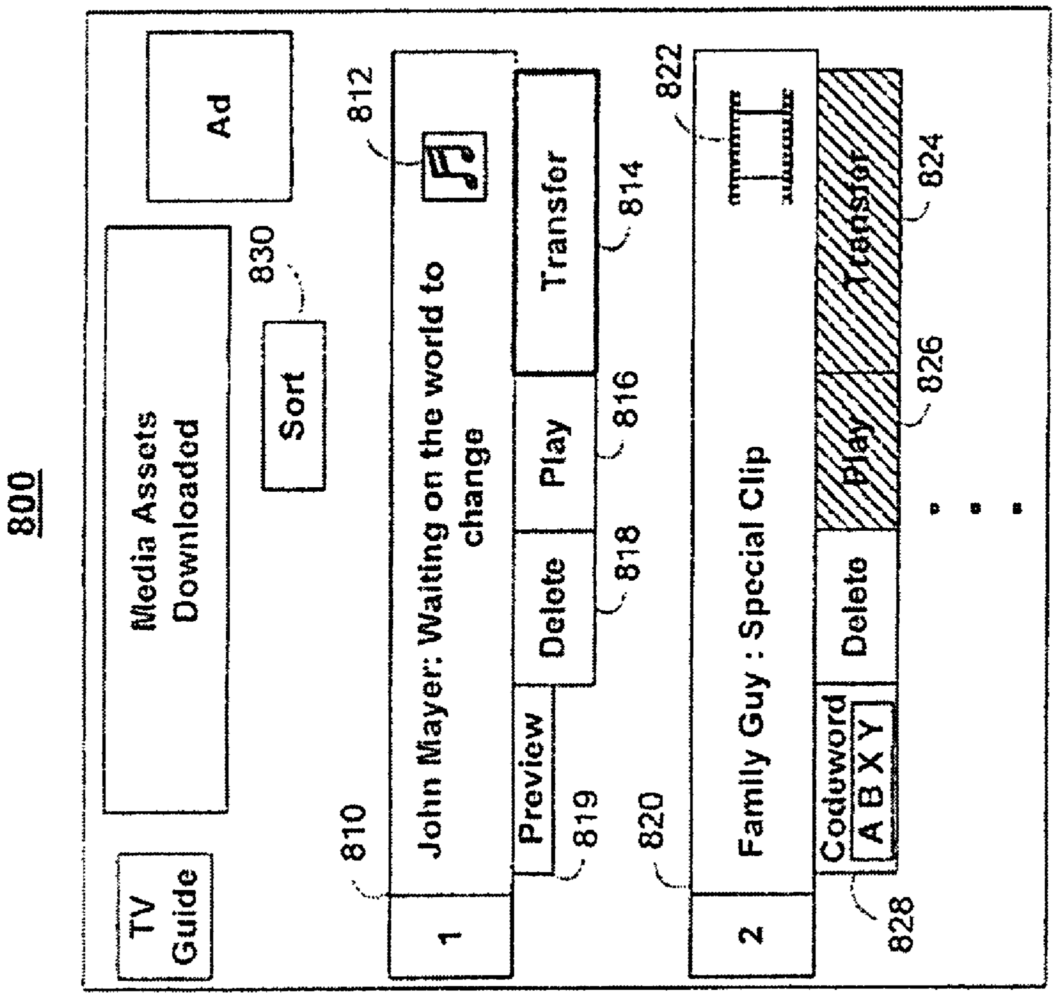
FIG. 8 shows a display of a listing of downloaded media assets in accordance with an embodiment of the present invention.

FIG. 8 shows a display 800 of a listing of downloaded media assets in accordance with an embodiment of the present invention. The display includes media asset listings 810 and 820.

The user may select a sort option 830 in display 800 to sort the displayed media asset listings in various ways. For example, the user may select the sort option 830 to sort the listings by type (e.g., music, video, ringtone, data, etc.), title (alphabetically), accessibility, payment requirement (i.e., whether or not payment is required to access the asset), transmission channel from which the media asset was received, length or size of the media asset, level of interest (i.e., the user may input a level of interest from 1-5 for each asset and sort the listings accordingly), or expiration date. For example, the broadcast source may place restrictions on the media assets such that access to the media assets is enabled for a particular range of time (e.g., until a particular date). Accordingly, the display 800 may sort the media asset listings in accordance with the expiration dates such that the first media asset listing has the earliest expiration date and the last media asset listing has the latest expiration date.

Media asset listing 810 includes the title or name of the media asset and various options. Media asset listing 810 includes a delete option 818, an access or play option 816, a preview option 819, and a transfer option 814. Media asset listing 810 may also include an icon 812 indicating the type of media asset that is associated with media asset listing 810. In particular, as discussed above, the icon 812 may identify the media asset listing as a video, a music or ringtone, or data file. Similarly, media asset listing 820 also may include an icon 822 indicating the type of media asset that is associated with the media asset listing 820.

Delete option 818 may be selected by the user to remove the media asset from the memory of the user television equipment. In some embodiments, as discussed above, the media asset may have an expiration date. When the expiration date is reached, the media asset may be automatically deleted or removed from the memory of the user television equipment.

An access or play option 816 may be selected by the user to cause the user television equipment to playback or display the media asset associated with the listing. For example, if the media asset is a video file, a selection of the play option 816 will cause the user television equipment to retrieve the video file from the memory and display or playback the video on the monitor of the user television equipment. If the media asset is displayed in the media asset listings but is not enabled for access (e.g., because the predetermined time period did not elapse, the user tuned away from the transmission channel before the predetermined time period elapsed, the trigger(s) was/were not received, or payment information or the codeword(s) was/were not entered) then option 816 may be grayed out or not displayed at all. For example, as shown in relation to media asset listing 820, the user is required to enter codeword(s) into input field 828, and until the codeword is entered, play option 826 may be grayed out or not displayed. This indicates to the user that the particular option is not available for selection.

Media asset listing 810 may also include transfer option 814. The user may select transfer option 814 to cause the user television equipment to transmit the media asset to another device such as a portable user device (e.g., portable computer, PDA, or mobile phone). For example, a music file media asset (e.g., ringtone) may be transmitted to a mobile phone. The user may set the media asset received on the mobile phone as the default ringtone for the mobile phone. The transfer may be performed through BLUETOOTH, 802.11 or any other wired or wireless transmission link. If the media asset is displayed in the media asset listings but is not enabled for access (e.g., because the predetermined time period did not elapse, the user tuned away from the transmission channel before the predetermined time period elapsed, the trigger(s) was/were not received, or payment information or the codeword(s) was/were not entered) then transfer option 814 may be grayed out or not displayed at all. For example, as shown in relation to media asset listing 820, the user is required to enter codeword into codeword input field 828, and until the codeword is entered, transfer option 824 may be grayed out or not displayed. This indicates to the user that the transfer option is not available for selection.

Media asset listing 810 may also include a preview option 819. When the user selects preview option 819, the user television equipment may playback or display some portion but not all of the media asset. For example, if the media asset is a music file, a selection of preview option 819 may cause the user television equipment to playback the first 30 seconds or the middle 30 seconds of the music file. It should be understood that the preview option 819 may be provided for media assets for which access is not enabled. This may enable the user to determine whether he/she is interested in the media asset and accordingly, desires access to the media asset.

For example, media asset listing 820 is not enabled for access. A user may select a preview option (not shown) for media asset listing 820 and cause the user television equipment to playback some portion but not all of the media asset associated with media asset listing 820. The preview option may be available even though the predetermined time period for the media asset has not elapsed and/or only some of the media asset portions have been received at the user television equipment. After the user previews the media asset, the user may decide to order (e.g., enter payment information) when access to the asset is restricted, or enter codeword(s) that are received for the media asset to have full playback (access) to the media asset enabled. Additionally, after previewing the media asset, the user may decide whether he/she desires to stay tuned to the transmission channel for the remainder of the predetermined broadcast interval.

It should be noted that display 800 of media asset listings may be provided concurrently with the display of a television program transmitted on a transmission channel. Thus, the user need not tune away from the transmission channel and risk losing access privileges to a media asset when the user desires to view the media asset listings. It should also be understood that the assets listed in media asset listings may be listed before, during or after the predetermined broadcast interval of a particular transmission channel begins. Thus, the user can see in advance of the television program broadcast, a list of media assets that may become accessible after tuning to a particular transmission channel for a predetermined time period. For example, media asset listing 820 may be displayed but not accessible because the trigger (or predetermined time period) was not received (or the predetermined time period did not elapse). However, after the trigger is received, the user may input, for example, a codeword to unlock or gain access to the media associated with media asset listing 820.

As discussed above, the media asset is transmitted to the user television equipment concurrently with the television program over the transmission channel. The bandwidth of the transmission channel may be limited in size and accordingly, an efficient manner of transmitting the media asset concurrently with the television program is to divide the media asset into portions. Each portion may be inserted into the available portion of the transmission channel and transmitted concurrently with the television program.

Figure 9:
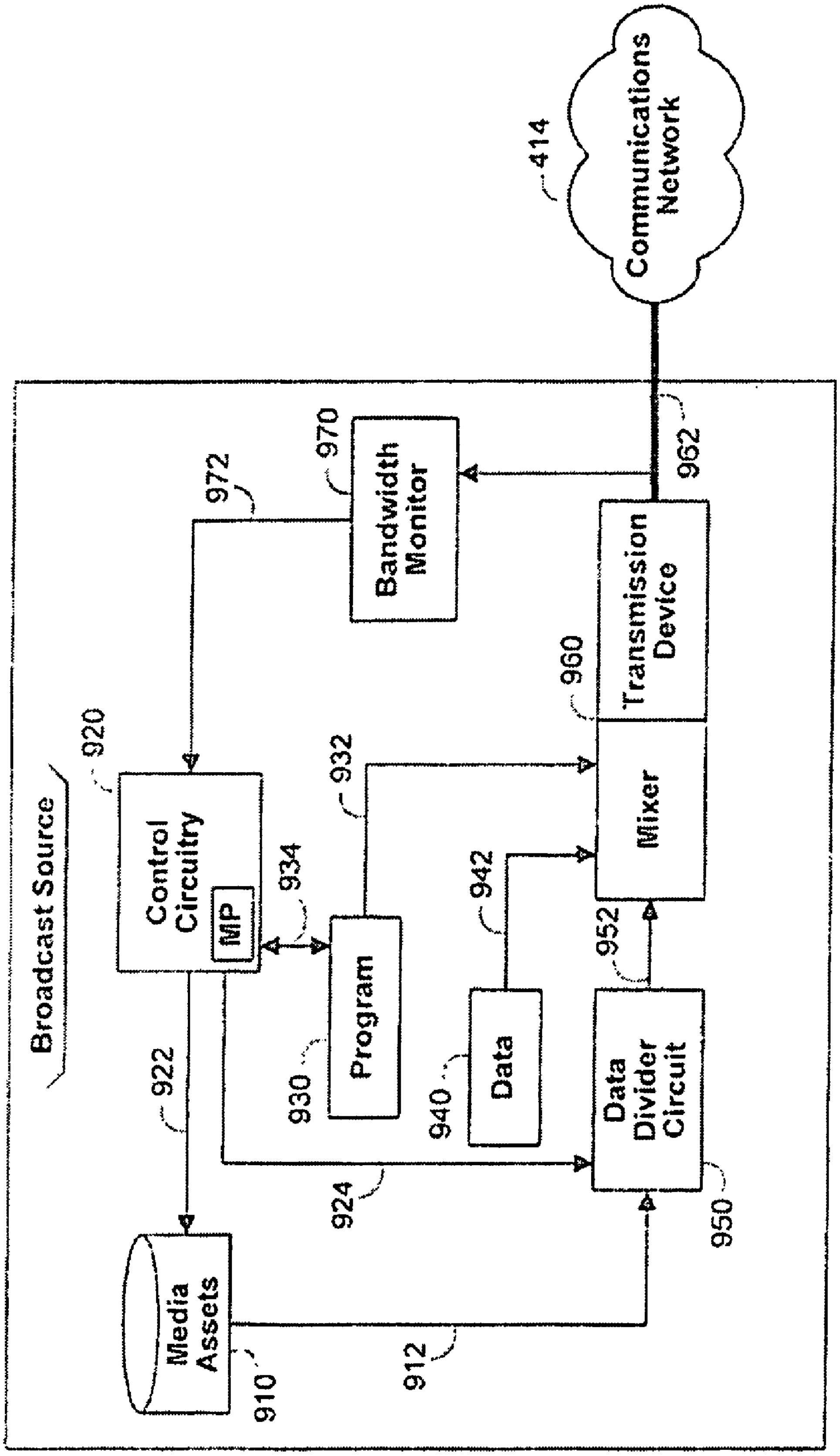
FIG. 9 shows a system for providing media assets related to a television program in accordance with an embodiment of the present invention.

FIG. 9 shows a system 900 for providing media assets related to a television program in accordance with an embodiment of the present invention. System 900 may include media assets memory 910, control circuitry 920, a program source 930, a data source 940, data divider circuit 950, a bandwidth monitor 970 and a mixer/transmission device 960.

Program source 930 may be implemented on or by media content source 416 (FIG. 4). Program source 930 receives programming from a particular network (e.g., CBS) and is coupled to mixer/transmission device 960 via link 932. Mixer/transmission device 960 may also be implemented by media content source 416 or alternatively by media guidance data source 418. The programming may be the television program that will ultimately be displayed on the user television equipment. Program source 930 is also coupled to control circuitry 920 (implemented on media content source 416) via link 934. Program source 930 may receive instructions from control circuitry 920 indicating which program to provide to mixer/transmission device 960. Program source 930 may alternatively provide at least a title and a description to control circuitry 920 indicating which program is being provided to mixer/transmission device 960. Program source 930 may also provide information regarding the duration of a particular program and the start/end times of the program to control circuitry 920 via link 934.

Data source 940 may be implemented on or by media content source 416. Data source 940 provides program data associated with the particular program of program source 930 to mixer/transmission device 960 via link 942. Data source 940 may receive the data from the same or a different network as program source 930. The data provided by data source may include closed-caption data for the program, advertisement data, or any other suitable data that is part of or related to the program.

Although only one program source 930 and one data source 940 are drawn in system 900, it should be understood that any number of program sources and data source may be provided. In particular, there may be at least one program source 930 for every transmission channel available through system 900.

Media assets memory 910 may be implemented on or by media content source 416 (FIG. 4). Media assets memory 910 includes a variety of different media assets that are available for transmission to a user television equipment. For example, media assets memory may include music, video, ringtone, or other data files that may ultimately be accessed by a user at a portable user device or the user television equipment.

Control circuitry 920 may be configured to select a particular media asset based on the program 930 that is being transmitted from program source 930. Control circuitry is coupled to media assets memory 910 via link 922 and may provide an address or instructions to retrieve a particular media asset for subsequent transmission.

The media asset is retrieved from media assets memory 910 and is provided to data divider circuit 950 via link 912. Although, media assets memory 910 and data divider circuit 950 are drawn as two separate components, one skilled in the art will appreciate that the functionality of data divider circuit 950 may be provided in media assets memory 910 and thus both the media assets memory 910 and data divider circuit 950 may be formed using one component. Alternatively, data divider circuit 950 may be implemented on or by media content source 416 (FIG. 4) and may be coupled to the media assets memory. Data divider circuit 950 divides the media asset it receives into a plurality of portions. The portions may each have a fixed size or may have different sizes. Data divider circuit 950 creates the media asset portion data structure 1100 shown in FIG. 11. Data divider circuit 950 may also be instructed by control circuitry 920 to insert a trigger into the transmission channel at some point in time. In particular, data divider circuit 950 may insert a trigger into a field of the media asset portion data structure or may alternatively create a new data structure for the trigger. The details of the data included in each media asset portion data structure are provided in connection with the description of FIG. 11.

Bandwidth monitor 970 may be implemented by media content source 416, media guidance data source 418 or may be a separate component that is coupled to links 420 and 422 to monitor bandwidth (FIG. 4). The bandwidth monitor 970 outputs information to control circuitry 920 in media content source 416. Bandwidth monitor 970 may be coupled to link 962 to monitor the bandwidth of the link that is being occupied by the transmission channel. In particular, the program and data provided by sources 930 and 940 may be mixed by mixer/transmission device 960 and transmitted over a particular transmission channel. The transmission channel may have a limited amount of bandwidth for additional data insertion. However, throughout the broadcast of the program over the transmission channel, the amount of data provided by data source 940 or program source 930 may vary. Consequently, there may be times at which the bandwidth has free space for data insertion, such as a media asset portion (i.e., the bandwidth is dynamic with respect to how much data can be inserted at a given time). For example, a high definition television program may consume a larger portion of the bandwidth than a standard definition television program. Consequently, when a standard definition program is transmitted, bandwidth monitor 970 determines that there is available bandwidth (i.e., the difference between the bandwidth consumption of the high versus the standard definition program) for insertion of a media asset portion. Additionally, program data such as closed-caption data may be inserted during some portions but not others of a television program transmission. Thus, during the portions of the television program transmission that program data is minimal or non-existent, bandwidth monitor may determine that the space ordinarily consumed by the program data is available for other data insertion such as a media asset portion.

The bandwidth monitor 970 analyzes the link 962 and determines what the available bandwidth is at a particular period of time. Bandwidth monitor 970 is coupled to control circuitry 920 via link 972 and provides information about the available space in the bandwidth of the transmission channel for data insertion such as a media asset portion.

Control circuitry 920 receives the bandwidth information, and when enough bandwidth is available for transmitting a media asset portion with the program, control circuitry 920 instructs data divider circuit 950 via link 924 to provide a given media asset portion to mixer/transmission device 960 via path 952 for insertion into the transmission channel. Accordingly, when mixer/transmission device 960 receives and mixes the media asset portion with the program the transmission channel includes the media asset and program. Consequently, the program and the media asset are concurrently provided to the user television equipment. Mixer/transmission device 960 transmits the data it receives through link 962 to communications network 414 which ultimately is received by user television equipment device, as discussed above in connection with FIG. 4.

Control circuitry 920 may use information it receives from program source 930 to generate or create the predetermined time period. For example, control circuitry 920 may receive information about the length of a particular program provided by program source 930 and may set the predetermined time period to be the duration of the program. Alternatively, control circuitry 930 may receive information from program source 930 about when commercial breaks are provided in the program transmission and may set the predetermined time period to be either the sum of all the commercial break times or the time periods during which commercials or advertisements are shown (e.g., the time periods from 9:12-9:15PM and 9:40-9:50PM). This ensures that the viewer stays tuned to the transmission channel during the commercial breaks because otherwise access to the media asset is prevented. Control circuitry 920 may instruct data divider circuit 950 to transmit media asset portions based on the predetermined time period. Additionally, control circuitry 920 may instruct data divider circuit 950 to transmit one or more triggers based on the predetermined time period control circuitry 920 sets.

Figure 10:
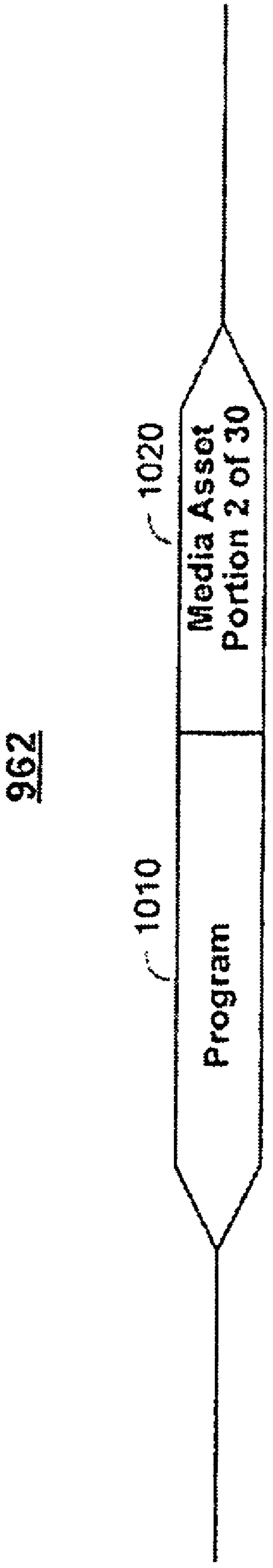
FIG. 10 shows a portion of information contained in the bandwidth of a link of a transmission channel in accordance with an embodiment of the present invention.

FIG. 10 shows a portion of information contained in the bandwidth of link 962 of a transmission channel in accordance with an embodiment of the present invention. In particular, FIG. 10 shows a snapshot in time of link 962 that includes the program data provided by program source 930 on a first portion 1010 of the transmission channel and a media asset portion provided by data divider circuit 950 on a second portion 1020 of the transmission channel. Together, the first and second portions 1010 and 1020 of the transmission channel occupy a substantial part of the total bandwidth available in the transmission channel.

Figure 11:
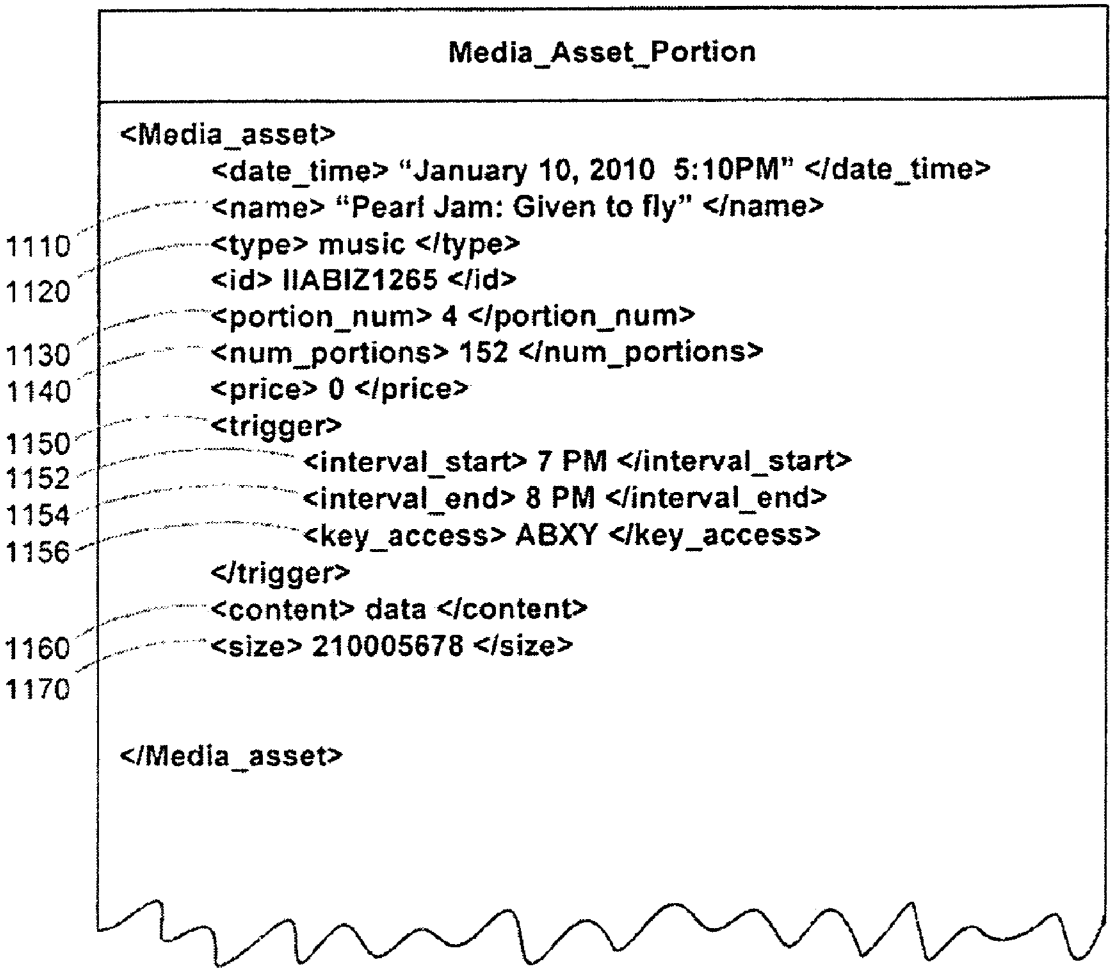
FIG. 11 shows an exemplary data structure for a media asset portion in accordance with an embodiment of the present invention.

FIG. 11 shows an exemplary data structure 1100 for a media asset portion created by data divider circuit 950 (FIG. 9) in accordance with an embodiment of the present invention. Media asset portion data structure 1100 may include a name field 1110, type field 1120, portion_num field 1130, num_portions field 1140, trigger field 1150, content field 1160 and size field 1170. Additional fields may be provided for indicating the date/time of the transmission of the media asset, an ID identifying the network through which the media asset is provided from or related to, transport, service and/or component tag.

Name field 1110 includes a string of characters representing the title or name of the media asset that is being transmitted. For example, the name field may be read and displayed as part of the media asset listing 810 or 820 (FIG. 8) so that the user can easily identify the media asset. Type field 1120 may be provided to identify what content is being provided by the media asset, such as music data, video data, ringtone data or data in general. The type field 1120 can be read by the system to determine which icon to display with the media asset listing 810 or 820.

Portion_num field 1130 may indicate where in the sequence of the plurality of media asset portions the particular portion associated with the data structure 1100 belongs. Num_portions field 1140 indicates the total number of media asset portions that were created by data divider circuit 950 for the media asset. For example, if data divider circuit 950 (FIG. 9) divides a media asset into three portions, and the media asset portion that is being transmitted is the second of the three portions, portion_num field 1130 is set to a value of ‘2’ and num_portions field 1140 is set to a value of ‘3’.

The user television equipment may use the portion_num field 1130 of each media asset portion data structure and num_portions field 1140 to determine whether all of the portions of the media asset have been received and to appropriately combine the media asset portions to reconstruct the media asset. Subsequently, after the predetermined time period elapses, the user television equipment may enable access to the media asset that has been reconstructed.

Before enabling access to the media asset (before or after reconstruction) the user television equipment may read a price field in the media asset portion data structure indicating whether payment is required for access to be enabled. If the user television equipment determines based on the price field that payment information is to be required, the user television equipment may receive and process an order request (as discussed above in connection with FIG. 6) from the user prior to enabling access for the media asset.

Content field 1160 may include the binary part of the media asset portion. The binary part of each of the media asset portions that make up the media asset are combined by the user television equipment to reconstruct the media asset. Subsequently, the media asset can be enabled for access. Size field 1170 may be used by the user television equipment to determine the total size of the media asset in, for example, bytes or bits. The total size represents the size of the media asset when the content from each of the media asset portions is combined to form the media asset. For example, if a media asset that is 2 MB large is divided into two portions, each portion’s data structure will have a content field 1160 having a size of 1 MB and a size field 1170 having a value of 2 MB. The user television equipment may use the size field 1170, after it reconstructs the media asset from the various portions, to detect any errors. Such errors can be detected when the size of the reconstructed media asset is less or greater than the size indicated by size field 1170. The user television equipment can either indicate that the media asset is corrupted or request from the broadcast source a retransmission of a portion or the total media asset. Alternatively, the user television equipment can monitor the received data portion of a transmission channel until it detects the transmission of the corrupted media asset or media asset portion and use it to correct the errors.

It should be understood, that the media asset might become corrupted (i.e., when combined its size is smaller than the original size of the media asset indicated by size field 1170) due to the user tuning to a different transmission channel before the predetermined broadcast interval elapses. Tuning away may cause the user television equipment to miss a media asset portion that is transmitted during that time period and consequently create a corrupted media asset file.

Media asset portion data structure 1100 may include a trigger field 1150. The trigger field 1150 may include information about the predetermined time period. Information about the predetermined time period may be included in an interval_start field 1152, an interval_end field 1154, or a key_access field 1156. Interval_start field 1152 indicates to the user television equipment the starting time from which to detect whether the user tunes away from the transmission channel. The interval_end field 1154 indicates to the user television equipment the ending time until which the television equipment is to monitor viewing behavior to detect whether the user tunes away from the transmission channel.

For example, if the value of interval_start field 1152 is 7PM and the value of interval_end field 1154 is 9PM, the monitor circuitry at the user television equipment is configured to monitor the tuner between the time of 7PM and 9PM to detect whether the transmission channel to which the tuner is tuned changes. This indicates that the user tuned away from the transmission channel before the predetermined time period (e.g., 7-9PM) and access to the media asset is to be prevented.

Key_access field 1154 includes a code or decryption key that can be used to remove access restrictions from a media asset. As discussed above, the trigger may be transmitted at a point, unknown to the user, and a code may be displayed on the screen (FIG. 7). The code that is displayed may be included in key_access field 1154 and used to remove access restrictions. For example, the user may be required to enter the code that is displayed before access to the media asset is enabled.

Alternatively, key_access field 1154 may include a decryption key. In some embodiments, the media asset reconstructed by the user television equipment may be encrypted. Accordingly, one or more of the portions of the media asset transmitted to the user television equipment may include a decryption key. The user television equipment may be required to apply the decryption key in order to enable access to the media asset. If the user tunes away from the transmission channel before the predetermined time period elapses, the user television equipment might not receive the portion of the media asset that includes the decryption key. Accordingly, access to the media asset may be prevented since the user television equipment will not be capable of decrypting the media asset.

For example, all of the portions of the media asset may be transmitted by the broadcast source and received by the user television equipment at the beginning of the predetermined time period (or in some implementations before the beginning of the predetermined time period) but the portions and/or the media asset may be encrypted. Thus, although the portions can be combined by the user television equipment before the predetermined time period elapses, access to the combined media asset portions is prevented because the decryption key has not been received. The decryption key may be transmitted at some later time (e.g., the end of the predetermined time period or a time unknown to the user) over the transmission channel to enable access to the media asset. The decryption key, although not transmitted with any one of the media asset portions, may be transmitted in the predetermined time period over the same transmission channel and may be used to decrypt the encrypted media asset. This ensures that if a media asset is small enough to be capable of transmission as one portion (or if desired, the media asset is transmitted in advance of the predetermined time period), access to the media asset can still be prevented by encrypting the media asset and not providing the decryption key until some criteria is met (e.g., the user not tuning to a different transmission channel before the predetermined time period elapses).

The user television equipment includes circuitry for monitoring the user behavior to ensure that the user stays tuned to the appropriate transmission channel throughout the predetermined time period. Additionally, the user television equipment includes circuitry for receiving and combining the portions of the media asset (transmitted concurrently with the television program over the transmission channel) and enabling access to the media asset. The access may be enabled on the user television equipment or on a user mobile device (external to the user television equipment).

Figure 12:
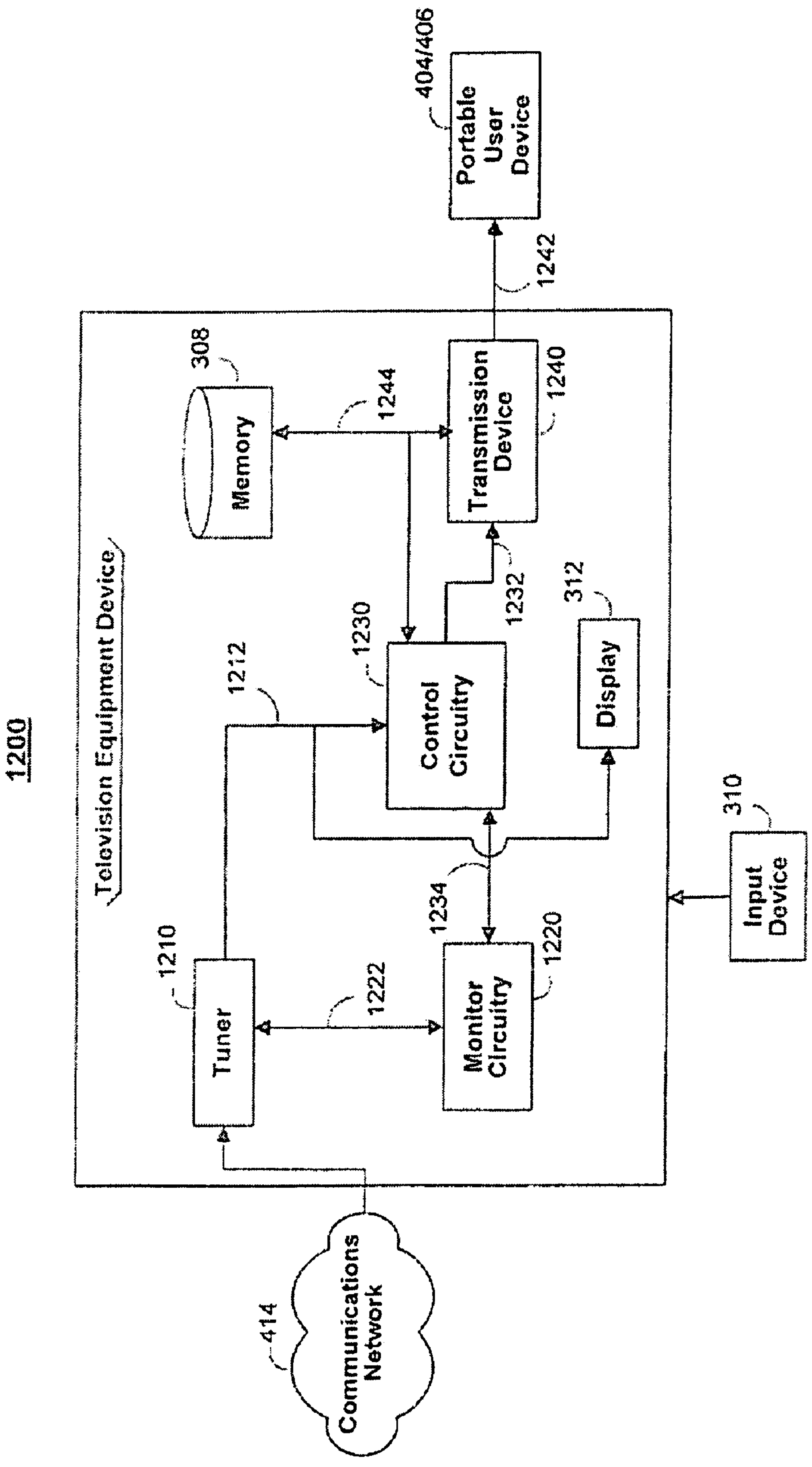
FIG. 12 shows a system for receiving media assets related to a television program in accordance with an embodiment of the present invention.

FIG. 12 shows a user television equipment 1200 for receiving media assets related to a television program in accordance with an embodiment of the present invention. As discussed above in connection with FIGS. 3 and 4, user television equipment 1200 may include at least one tuner 1210, monitor circuitry 1220 transmission device 1240, and control circuitry 1230.

Input device 310 may be used to instruct control circuitry 1230 to tune tuner 1210 to a particular transmission channel. A television program is received through tuner 1210 from communications network 414. Tuner is coupled to display 312 via link 1212 and the program is displayed. Tuner 1210 may receive concurrently with the television program, over the transmission channel, a media asset portion data structure 1100 (FIG. 11).

Control circuitry 1230 is coupled to tuner 1210 via link 1212 and may extract information from fields of the received media asset portion data structure. For example, control circuitry 1230 may extract the predetermined time period from trigger field 1150. Control circuitry 1230 may instruct monitor circuitry 1220 to monitor viewing behavior for the predetermined time period corresponding to the received trigger. For example, the trigger fields may include a start and an end time for the predetermined time period. The start and end time may be 9PM and 10PM respectively. Accordingly, monitor circuitry 1220 may be instructed to monitor viewing behavior between the predetermined time period of 9-10PM.

Throughout the predetermined time period or whenever a media asset portion data structure is received, control circuitry 1230 may store the data structure or some portions of it to memory 308. Control circuitry 1230 is coupled to memory 308 via link 1244 and may retrieve stored portions of the media asset from memory 308 and combine them to reconstruct the media asset. The media asset may then either be stored in the memory 308 or provided to portable user device 404/406 through transmission device 1240.

Control circuitry 1230 may also generate a listing of media assets and store the listing in memory 308. Control circuitry 1230 may retrieve the listings and display them for a user on display 312.

Monitor circuitry 1220 is coupled to tuner 1210 via link 1222. Monitor circuitry 1220 monitors the transmission channel that tuner 1210 is tuned to during the predetermined time period. In some implementations, monitor circuitry 1220 polls the tuner several times per minute or second or some other suitable time frame. The tuner may provide the current transmission channel to which it is tuned when monitor circuitry 1220 polls the tuner. Monitor circuitry 1210 may determine whether the transmission channel matches the one corresponding to the media asset. For example, media asset portion data structure may include a transmission channel field and based on the value stored in the transmission channel field, monitor circuitry may determine whether the tuner is tuned to the appropriate channel (i.e., an transmission channel having the same value as the one stored in the transmission channel field).

In some implementations, monitor circuitry 1220 may receive a trigger from tuner 1210 that may include information necessary for enabling access to a media asset. For example, monitor circuitry 1220 may receive a trigger at some point during a predetermined time period which includes a codeword. Monitor circuitry 1220 may provide the trigger information (e.g., codeword(s)) to control circuitry 1230 which may display the trigger information on display 312. At some later point, the user may be requested to provide the received codeword(s) for enabling access to the media asset. Input device 310 may be used to provide the codeword(s) that correspond to the media asset and access may thereby be enabled.

In some embodiments, instead of displaying codeword(s) on the display, control circuitry 1230 may store the received trigger information in memory 308 and may apply the trigger information to the media asset automatically to enable access to the media asset. For example, during the predetermined time period, control circuitry 1230 may receive trigger(s) and extract the codeword(s) from the trigger(s). Control circuitry 1230 may store the codeword(s) in the memory and when the predetermined time period elapses, control circuitry 1230 may automatically apply the codeword(s) to the media asset to enable access to the media asset.

In some implementations, monitor circuitry 1220 may extract access information such as a decryption key from the trigger received from tuner 1210. The access information may be provided to control circuitry 1230 for removing access restrictions from the received media asset. For example, control circuitry may combine encrypted media asset portions stored in memory 308 and decrypt the media asset using a decryption key received with the trigger.

Monitor circuitry 1220 may determine that the tuner 1210 has been tuned to a different transmission channel before the predetermined time period elapses and may provide such information to control circuitry 1230 via link 1234. Control circuitry 1230 may prevent access to the media asset based on this information by, for example, deleting from memory 308 any portions of the media asset which have been stored during the predetermined time period.

In some embodiments, control circuitry 1230 may determine that the tuner has been tuned to a different transmission channel during the predetermined time period. For example, control circuitry 1230 may detect a break in the sequence of media asset portions. In particular, each media asset portion may be numbered according to its position in the sequence of the media asset portions. For example, there may be 25 portions and a particular media asset portion may be numbered 4 of the 25 portions. Control circuitry 1230 may receive the portions in sequence and if a particular number is skipped or missed in the sequence, control circuitry 1230 may determine that the tuner has been tuned to a different transmission channel before the predetermined time period has elapsed.

For example, the tuner may be tuned to a channel (e.g., channel 1) and media asset portions may be received in sequence (e.g., 1 of 25, 2 of 25, 3 of 25, etc.). When the tuner is tuned to a different channel (e.g., channel 2) during the predetermined time period, a break in the sequence may occur. In particular, if the next media asset portion that is expected in the sequence is portion 4 of 25 but instead, portion 6 of 25 is received, the control circuit may detect the break in the sequence and consequently determine that the tuner has been tuned to a different transmission channel. Accordingly, the control circuitry may prevent access to the media asset. Additionally, a missing portion in the media asset sequence will make it impossible to re-constitute the media asset file, even if permission to reconstitute the media asset is given or bypassed. In particular, when a portion of the media asset is missed (e.g., due to the tuning away to a different channel) it becomes impossible to combine the received portions of the media asset to re-create the original media asset. Moreover, even if a trigger is or has been received by the user television equipment that includes, for example, a key to enable access to the media asset, a missing portion will nevertheless prevent access. This is because combining all but one or more portions of the media asset results in a corrupt media asset and applying a valid key, that may be included with a trigger, to a corrupt media asset does make the media asset accessible.

Monitor circuitry 1220 may also inform control circuitry 1230 that a criteria has been met, for example, that the tuner has not been tuned to a different transmission channel before the predetermined time period elapses. Control circuitry 1230 may enable access to the media asset based on the information it receives from monitor circuitry 1220 by, for example, combining the various media asset portions stored in memory 308 to reconstruct the media asset.

Transmission device 1240 is coupled to control circuitry 1230 via link 1232 and may receive instructions to transmit a media asset from memory 308 to a portable user device 404/406 via link 1242. Transmission device 1240 may be configured to communicated with portable user device 404/406 using any wired or wireless communications path as discussed above in connection with FIG. 4. Portable user device 404/406 may receive the reconstructed media asset. The media asset may be accessed by the portable user device 404/406 by, for example, playing back the movie or music file. Additionally, when the media asset is ringtone, the user may receive the ringtone from user television equipment 1200 at the portable user device 404/406 (e.g., a mobile phone) and set it as the default ringtone of the mobile phone.

Figure 13:
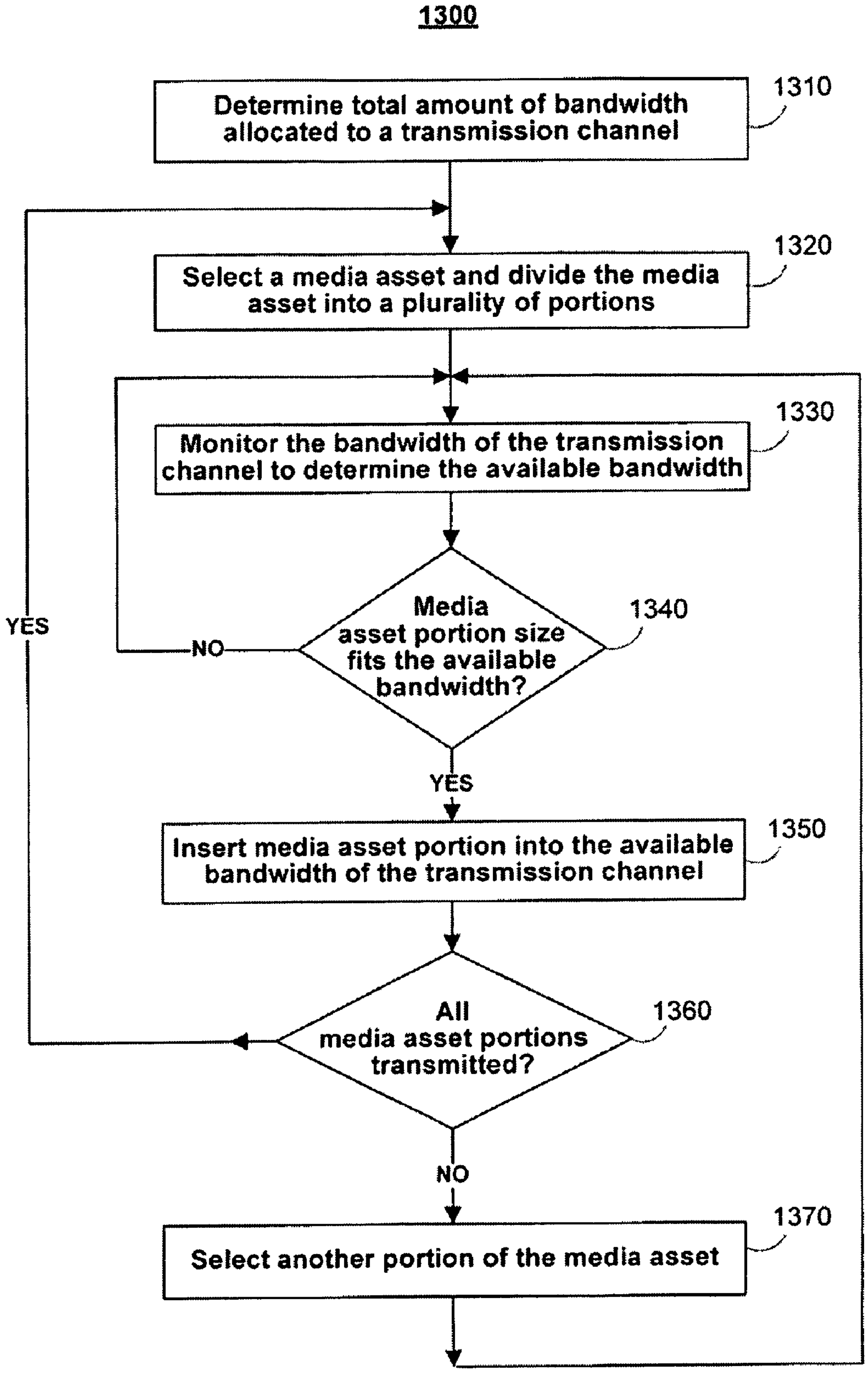
FIGS. 13-16 are illustrative flow diagrams for enabling access to a media asset at a television equipment device in accordance with embodiments of the present invention.

FIG. 13 is an illustrative flow diagram 1300 for enabling access to a media asset at a television equipment device in accordance with an embodiment of the present invention. At step 1310, the total amount of bandwidth allocated to a transmission channel is determined. For example, control circuitry 920 determine by receiving information from program source 930 what the total allocated bandwidth is for a particular transmission channel (FIG. 9). This information can also be preconfigured as it may be predetermined by the broadcast source 900.

At step 1320, a media asset is selected and divided into multiple portions. For example, control circuitry 920 may select a media asset from media assets storage 910. The media asset is selected based on information received by program source 930 such that the media asset is related to a program provided by program source 930. The selected media asset is provided to data divider circuit 950 to be divided into multiple portions (FIG. 9).

At step 1330, the bandwidth of the transmission channel is monitored to determine the available bandwidth. For example, bandwidth monitor 970 is coupled to link 962 and may determine the available bandwidth by comparing the current bandwidth consumed by the program source 930 and data source 940 to the total allocated bandwidth of the transmission channel (FIG. 9). For example, a standard definition television program may be broadcast and may thereby consume less of the total bandwidth than a high definition. Accordingly, bandwidth monitor 970 may determine the difference to be the available bandwidth of the transmission channel.

At step 1340, a determination is made as to whether the media asset portion size fits into the available bandwidth. For example, control circuitry 920 may receive information from bandwidth monitor 970 about the available bandwidth and may determine whether the media asset portion (provided by data divider circuit 950) fits into the available bandwidth (i.e., is less than or equal to the size of the available bandwidth). The media asset portion is inserted into the available bandwidth of the transmission channel at step 1350 when the media asset portion size fits into the available bandwidth. Otherwise, the bandwidth of the transmission channel is monitored at step 1330 to determine the available bandwidth at another point in time.

At step 1350, the media asset portion is inserted into the available bandwidth of the transmission channel when the media asset portion fits the available bandwidth. For example, mixer/transmission device 960 receives the media asset portion from data divider circuit 950 and inserts it into the transmission channel by mixing the media asset portion with the program data provided by program source 930 (FIG. 9). Mixer/transmission device 960 transmits the program and the media asset over the transmission channel through link 962.

At step 1360, a determination is made as to whether all of the media asset portions have been transmitted. For example, control circuitry may query data divider circuit 950 to determine whether all of the portions of the particular media asset have been transmitted. When all of the portions have been transmitted, another media asset is selected and divided at step 1320. When not all of the media asset portions have been transmitted, another portion of the multiple portions of the media asset is selected at step 1370. After another portion is selected at step 1370, the bandwidth is monitored at step 1330 to determine the available bandwidth to transmit the newly selected portion of the media asset.

Figure 14:
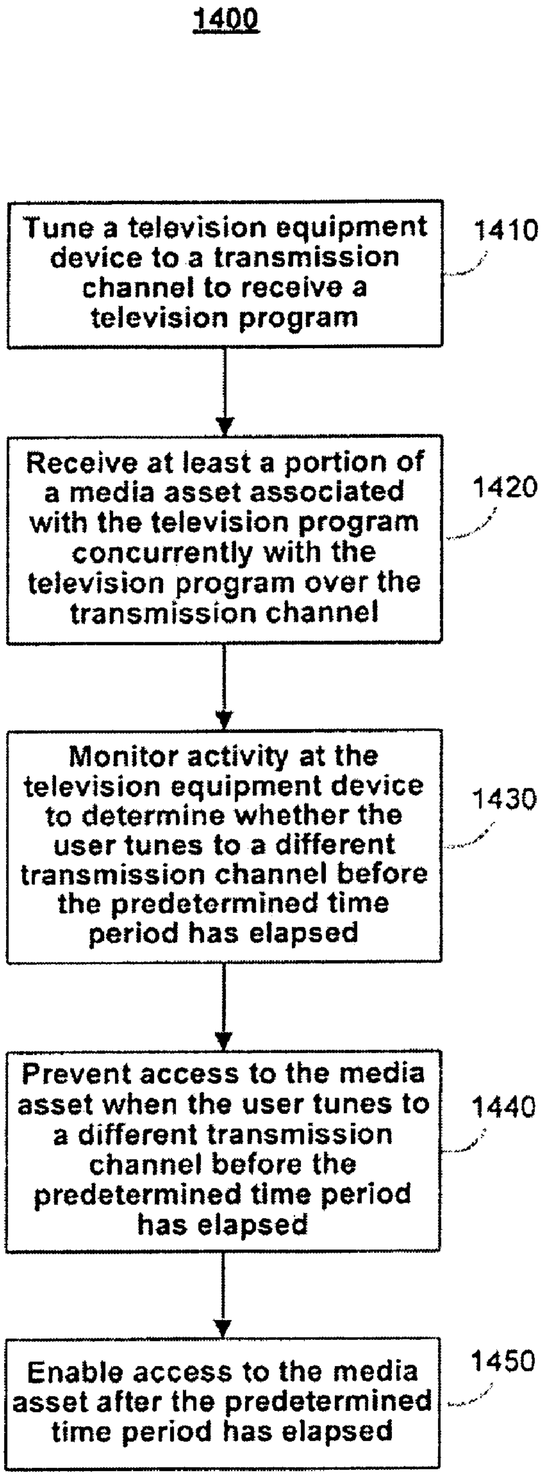

FIG. 14 is an illustrative flow diagram 1400 for enabling access to a media asset at a television equipment device in accordance with an embodiment of the present invention. At step 1410, a television equipment device is tuned to a transmission channel to receive a television program. For example, tuner 1210 is instructed by control circuitry 1230 to tune to a particular transmission channel (FIG. 12). Tuner 1210 receives a television program and displays the program on display 312 along with an indicator 510 of the transmission channel (FIG. 5).

At step 1420, at least a portion of a media asset that is associated with the television program is received concurrently with the television program over the transmission channel. For example, mixer/transmission device 960 combines the program with at least a portion of a media asset when there is available bandwidth, as determined by bandwidth monitor 970 (FIG. 9). A portion of link 962 associated with the transmission channel includes the program 1010 and another portion includes the portion of the media asset 1020 (FIG. 10).

At step 1430, activity at the television equipment device is monitored to determine whether the user tunes to a different transmission channel before a predetermined time period has elapsed. For example, monitor circuitry 1220 receives information from tuner 1210 to detect whether a criteria regarding the predetermined time period is met. In particular, monitor circuitry 1220 may determine whether tuner 1210 is tuned to a different transmission channel before the predetermined time period (set by control circuitry 1230) (e.g., time period between 9-10PM) has elapsed (FIG. 12).

At step 1440, access to the media asset is prevented when the user tunes to a different transmission channel before the predetermined time period has elapsed. For example, monitor circuitry 1220 provides information to control circuitry 1230 about the viewing activity during the predetermined time period. When control circuitry 1230 receives information that the tuner has been tuned to a different transmission channel before the predetermined time period has elapsed, it may prevent access to the media asset by removing portions of the media asset stored in memory 308 (FIG. 12). Alternatively, monitor circuitry 1220 may receive a trigger, at some point during the predetermined time period, that is necessary to enable access to the media asset. When the tuner is tuned to a different transmission channel before the predetermined time period elapses, the trigger may not be received and consequently access to the media asset is prevented.

At step 1450, access to the media asset is enabled after the predetermined time period has elapsed. For example, monitor circuitry may determine that the tuner has not been tuned to a different transmission channel before the predetermined time period has elapsed and may provide such information to control circuitry 1230. Control circuitry 1230 may combine the received portions of the media asset to enable access to the media asset. Alternatively, monitor circuitry may receive a trigger, at some point during the predetermined time period, that is necessary to enable access to the media asset. The trigger may be used to remove access restrictions or enable access to the media asset after the predetermined time period has elapsed.

In some embodiments, all of the media asset portions may be received before the predetermined time period elapses. Access to the media asset may still be prevented when the user tunes to a different transmission channel before the predetermined time period elapses by continuously monitoring the activity at the tuner during the predetermine time period. Thus, even though all of the media asset portions are received, access to the media asset can still be prevented if some criteria is met (e.g., tuning to a different transmission channel before the predetermined time period elapses).

Figure 15:
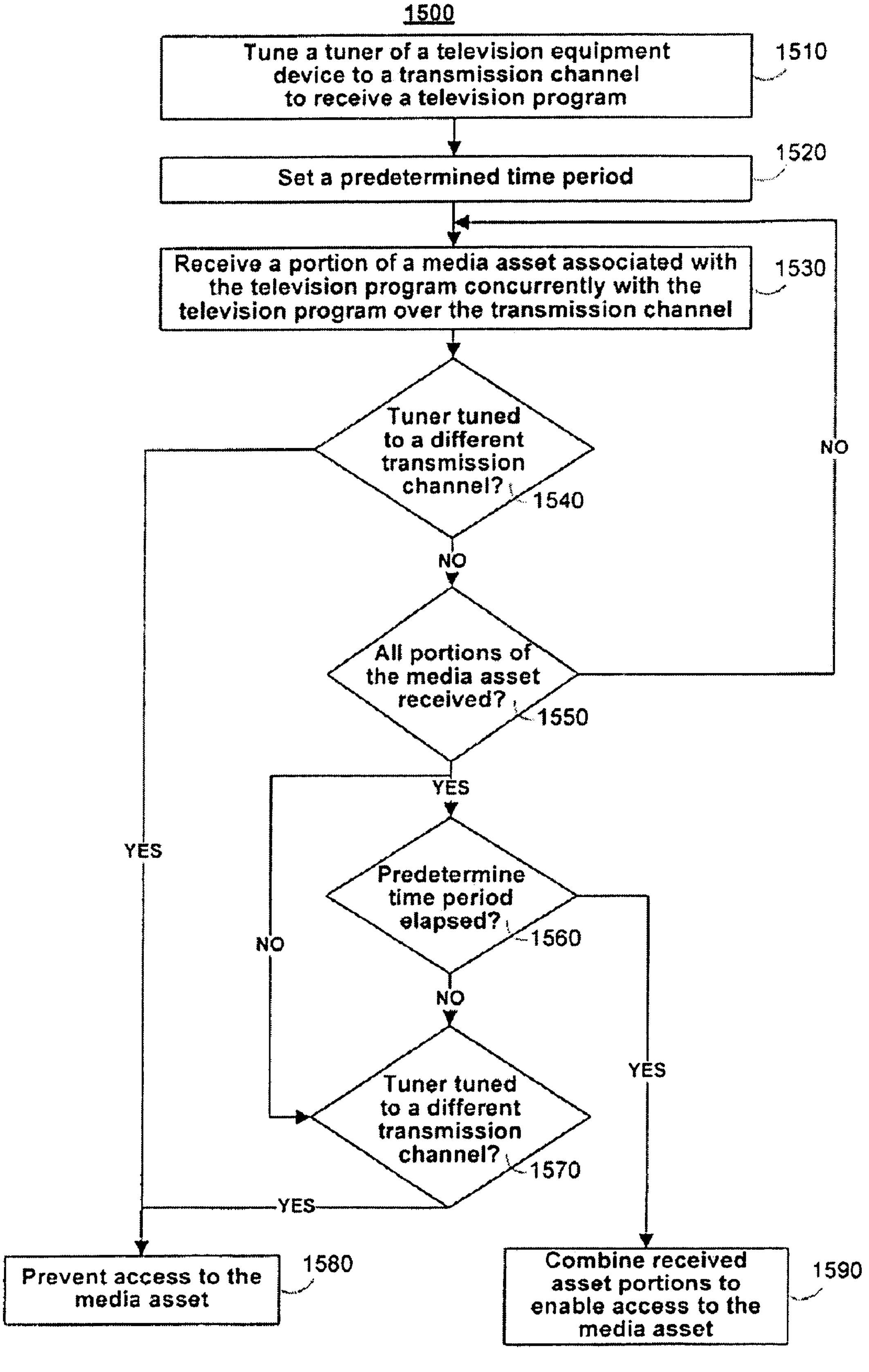

FIG. 15 is an illustrative flow diagram 1500 for enabling access to a media asset at a television equipment device in accordance with an embodiment of the present invention. At step 1510, a tuner of the television equipment device is tuned to a transmission channel to receive a television program.

At step 1520, a predetermined time period is set. For example, a trigger may be received by the user television equipment indicating a time interval of the predetermined time period. Alternatively, information stored in a media asset data structure may indicate the time and duration of the predetermined time period (e.g., the time of 9PM and duration of 1 hour).

At step 1530, a portion of a media asset associated with the television program is received concurrently with the television program over the transmission channel.

At step 1540, a determination is made as to whether the tuner has been tuned to a different transmission channel. For example, monitor circuitry 1220, polls the tuner 1210 to determine whether the transmission channel to which the tuner is tuned matches the transmission channel of the media asset portions (FIG. 12). When monitor circuitry 1220 determines that the tuner has been tuned to a different transmission channel, access to the media asset is prevented at step 1580. When monitor circuitry 1220 determines that the tuner has not been tuned to a different transmission channel, at step 1550, a determination is made as to whether all portions of the media asset have been received. For example, control circuitry 1230 may determine how many portions exist and what the next portion in the sequence of portions is by examining portion_num field 1130 and num_portions 1140 of media asset portion data structure 1100 (FIG. 11).

At step 1550, when all portions of the media asset have not been received, a next portion of the media asset portions is received at step 1530. When all portions of the media asset have been received, at step 1560, a determination is made as to whether the predetermined time period has elapsed. For example, monitor circuitry 1220 may provide information to control circuitry 1230 indicating that the predetermine time period (e.g., the time frame between 9-10PM) has elapsed.

At step 1560, when the predetermined time period has elapsed, at step 1590, the received media asset portions are combined to enable access to the media asset. Alternatively, information stored in a trigger may be applied to the media asset portions to enable access to the media asset. When the predetermined time period has not elapsed, at step 1570, a determination is made as to whether the tuner has been tuned to a different transmission channel.

At step 1570, a determination is made as to whether the tuner has been tuned to a different transmission channel. When monitor circuitry 1220 determines that the tuner has been tuned to a different transmission channel, access to the media asset is prevented at step 1580. When monitor circuitry 1220 determines that the tuner has not been tuned to a different transmission channel, at step 1560, a determination is made as to whether the predetermined time period has elapsed.

In some embodiments, a trigger may be received at a point unknown to the user, during the predetermined time period, that is used to enable access to a media asset. Information stored in the trigger is applied to media asset portions and access to the media asset is enabled.

Figure 16:
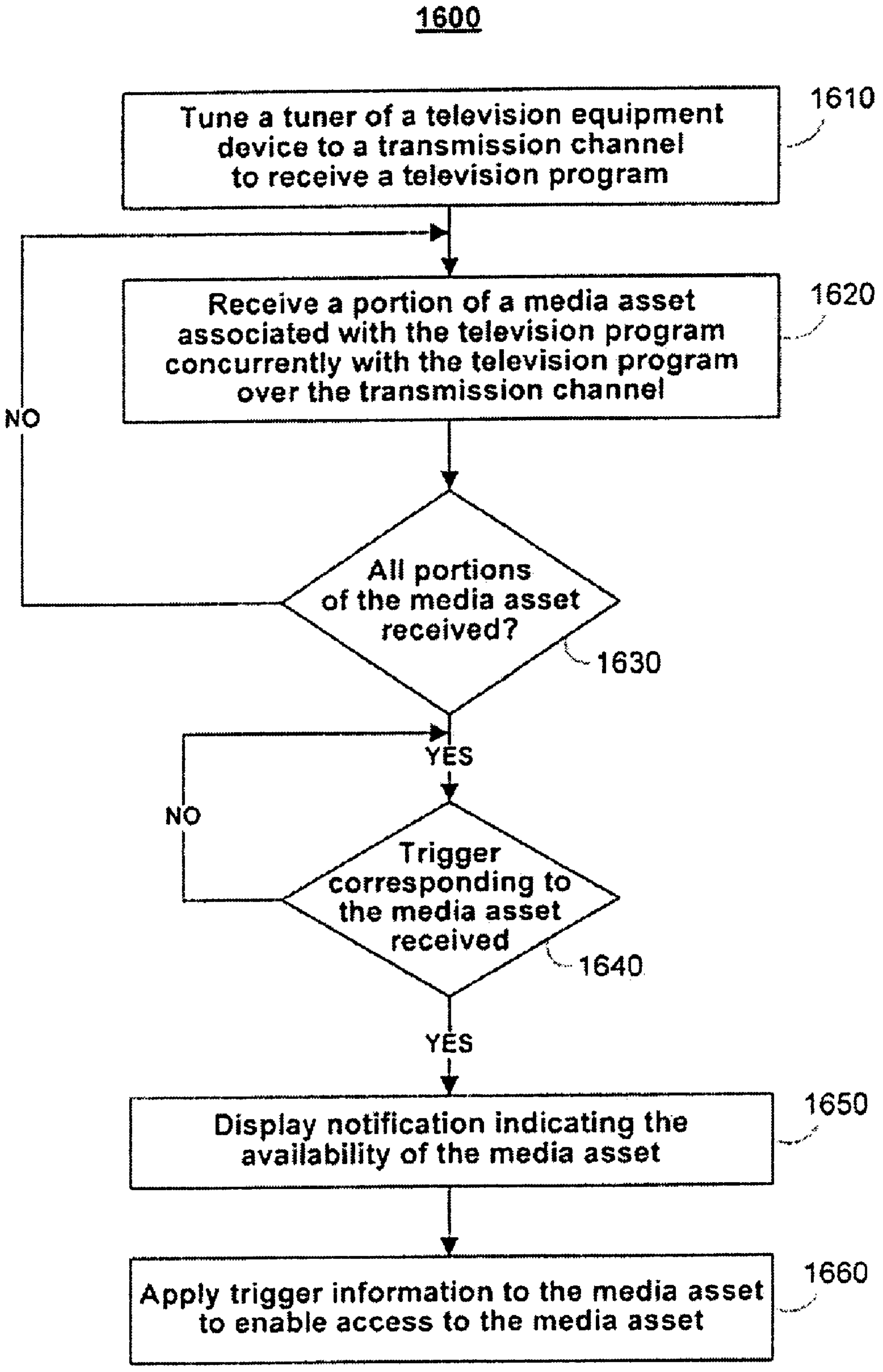

FIG. 16 is an illustrative flow diagram 1600 for enabling access to a media asset at a television equipment device in accordance with an embodiment of the present invention. At step 1610, a tuner of a television equipment device is tuned to a transmission channel to receive a television program.

At step 1620, a portion of a media asset associated with the television program is received concurrently with the television program over the transmission channel. For example, as discussed above, mixer/transmission device 960 combines the program with at least a portion of a media asset when there is available bandwidth, as determined by bandwidth monitor 970 (FIG. 9). A portion of link 962 associated with the transmission channel includes the program 1010 and another portion includes the portion of the media asset 1020 (FIG. 10).

At step 1630, a determination is made as to whether all portions of the media asset have been received. For example, control circuitry 1230 may determine how many portions exist and what the next portion in the sequence of portions is by examining portion_num field 1130 and num_portions 1140 of media asset portion data structure 1100 (FIG. 11).

At step 1630, when all portions of the media asset have not been received, a next portion of the media asset is received at step 1620. When all portions of the media asset have been received, at step 1640, a determination is made as to whether a trigger corresponding to the media asset has been received. A loop is created, awaiting the receipt of the trigger at step 1640. When the trigger corresponding to the media asset is received, at step 1650, a notification indicating the availability of the media asset is displayed. For example, as shown in display 700, notification 710 indicating the availability of the media asset along with a trigger (e.g., codeword(s) 720) are displayed.

At step 1660, trigger information is applied to the media asset to enable access to the media asset. For example, as shown in display 800, the user may input information associated with the received trigger (e.g., codeword(s)) into field 828. The system may then remove access restrictions and enable access to the media asset. Alternatively, the system may automatically apply the trigger information to remove access restrictions and enable access to the media asset. In such automated implementations, it may not be necessary to display the trigger (e.g., codeword(s)). Consequently, in such automated implementations, the user may not be required to enter trigger information to enable access to the media asset. Instead, as discussed above, the system may store the received trigger and when the predetermined time period elapses, automatically apply the trigger information to the media asset to enable access to the media asset. The media asset may be transmitted to a portable user device and subsequently accessed on the portable user device.

The above described embodiments of the present invention are presented for purposes of illustration and not of limitation, and the present invention is limited only by the claims which follow.

What is claimed is:

1. A method for motivating a user to watch a transmission channel of a broadcast source for a predetermined time period, the method comprising:

tuning a television equipment device to the transmission channel to receive a television program;

receiving a plurality of portions of a media asset associated with the television program concurrently with the television program over the transmission channel, wherein each portion is received at a different time point in the predetermined time period;

storing, without user input, each of the plurality of received portions;

monitoring activity at the television equipment device to determine whether the user tunes to a different transmission channel before the predetermined time period has elapsed;

preventing access to the media asset when the user tunes to a different transmission channel before the predetermined time period has elapsed; and enabling access to the media asset after the predetermined time period has elapsed.

2. The method of claim 1 further comprising:

displaying an indicator for the viewer indicating the availability of the media asset.

3. The method of claim 1 further comprising:

receiving payment information from the user for the media asset;

wherein access to the media asset is enabled after the predetermined time period has elapsed and the payment information has been processed.

4. The method of claim 1 further comprising:

selecting, at the television broadcast source, without receiving a user input, the media asset;

dividing, at the television broadcast source, the media asset into the plurality of portions; and inserting, one of the plurality of portions of the media asset into the transmission channel of the television program, wherein:

the television program is received over a first portion of the transmission channel and the inserted portion of the media asset is received over a second portion of the transmission channel.

5. The method of claim 4 further comprising:

monitoring bandwidth of the transmission channel to determine whether a portion of the bandwidth is available for data insertion;

wherein each of the plurality of portions of the media asset are inserted into the transmission channel when the bandwidth becomes available.

6. The method of claim 5 wherein each of the plurality of portions of the media asset are inserted in place of other television program data, wherein the other television program data is closed-captioned data, audio data, or advertisement data.

7. The method of claim 4 wherein the preventing comprises:

storing the received portions of the media asset to a memory on the television equipment device during the predetermined time period which the television equipment device is tuned to the transmission channel, wherein:

the media asset becomes accessible by the television equipment device only after every portion of the plurality of portions of the media asset is stored, and the media asset becomes inaccessible by the television equipment device when the television equipment device is tuned to a different transmission channel before the predetermined time period has elapsed and before every portion of the plurality of portions of the media asset is stored.

8. The method of claim 1 wherein the monitoring comprises polling a tuner of the television equipment device at various points in time, unknown to the user, during the predetermined time period to detect to which transmission channel the television equipment device is tuned.

9. The method of claim 1 wherein the monitoring comprises:

displaying a codeword at a particular point in time, unknown to the user, during the predetermined time period; and receiving a user input based on the codeword to enable access to the media asset.

10. The method of claim 1 wherein the monitoring comprises:

receiving a trigger from the broadcast source at a particular point in time, unknown to the user, during the predetermined time period, wherein the trigger includes interval length information of the predetermined time period.

11. The method of claim 1 further comprising:

transmitting, after access to the media asset is enabled, the media asset to a portable user device; and accessing the media asset on the portable user device.

12. The method of claim 1 wherein the predetermined time period comprises a start and an end time, wherein each of the plurality of portions of the media asset is received before the start time.

13. A system for motivating a user to watch a transmission channel of a broadcast source for a predetermined time period, the system comprising:

a tuner that is tuned to the transmission channel, the tuner configured to:

receive a television program; and receive a plurality of portions of a media asset associated with the television program concurrently with the television program over the transmission channel, wherein each portion is received at a different time point in the predetermined time period; and control circuitry configured to:

store, without user input, each of the plurality of received portions;

monitor activity at the television equipment device to determine whether the user tunes to a different transmission channel before the predetermined time period has elapsed;

prevent access to the media asset when the user tunes to a different transmission channel before the predetermined time period has elapsed; and enable access to the media asset after the predetermined time period has elapsed.

14. The system of claim 13 further comprising:

a display device for displaying an indicator for the viewer indicating the availability of the media asset.

15. The system of claim 13 wherein the control circuitry is further configured to:

receive payment information from the user for the media asset; and enable access to the media asset after the predetermined time period has elapsed and after the payment information has been processed.

16. The system of claim 13 further comprising:

control circuitry at the broadcast source configured to:

select, without receiving a user input, the media asset;

divide the media asset into the plurality of portions; and insert, one of the plurality of portions of the media asset into the transmission channel of the television program, wherein:

the tuner receives the television over a first portion of the transmission channel and the inserted portion of the media asset over a second portion of the transmission channel.

17. The system of claim 16 wherein the control circuitry at the broadcast source is further configured to:

monitor bandwidth of the transmission channel to determine whether a portion of the bandwidth is available for data insertion; and insert each of the plurality of portions of into the transmission channel when the bandwidth becomes available.

18. The system of claim 17 wherein each of the plurality of portions of the media asset are inserted in place of other television program data, wherein the other television program data is closed-captioned data, audio data, or advertisement data.

19. The system of claim 16 wherein the control circuitry is further configured to prevent access by:

storing the received portions of the media asset to a memory on the television equipment device during the predetermined time period which the television equipment device is tuned to the transmission channel, wherein:

the media asset becomes accessible by the television equipment device only after every portion of the plurality of portions of the media asset is stored, and the media asset becomes inaccessible by the television equipment device when the television equipment device is tuned to a different transmission channel before the predetermined time period has elapsed and before every portion of the plurality of portions of the media asset is stored.

20. The system of claim 13 wherein the control circuitry is further configured to monitor by polling the tuner at various points in time, unknown to the user, during the predetermined time period to detect to which transmission channel the tuner is tuned.

21. The system of claim 13 wherein the control circuitry is further configured to:

display on a display device a codeword at a particular point in time, unknown to the user, during the predetermined time period; and receive a user input based on the codeword to enable access to the media asset.

22. The system of claim 13 wherein the control circuitry is further configured to:

receive a trigger from the broadcast source at a particular point in time, unknown to the user, during the predetermined time period, wherein the trigger includes interval length information of the predetermined time period.

23. The system of claim 13 wherein the control circuitry is further configured to:

transmit, after access to the media asset is enabled, the media asset to a portable user device.

24. The system of claim 13 wherein the media asset is a ringtone.

25. The system of claim 13 wherein the predetermined time period comprises a start and an end time, wherein each of the plurality of portions of the media asset is received before the start time.

26. A method for motivating a user to watch a transmission channel of a broadcast source for a predetermined time period, the method comprising:

tuning a television equipment device to the transmission channel to receive a television program;

receiving at least a portion of a media asset associated with the television program concurrently with the television program over the transmission channel;

receiving a trigger from the broadcast source at a particular point in time, unknown to the user, during the predetermined time period, wherein the trigger includes interval length information of the predetermined time period;

monitoring activity at the television equipment device to determine whether the user tunes to a different transmission channel before the predetermined time period has elapsed;

preventing access to the media asset when the user tunes to a different transmission channel before the predetermined time period has elapsed; and enabling access to the media asset after the predetermined time period has elapsed.

27. A system for motivating a user to watch a transmission channel of a broadcast source for a predetermined time period, the system comprising:

a tuner that is tuned to the transmission channel, the tuner configured to:

receive a television program; and receive at least a portion of a media asset associated with the television program concurrently with the television program over the transmission channel; and control circuitry configured to:

receive a trigger from the broadcast source at a particular point in time, unknown to the user, during the predetermined time period, wherein the trigger includes interval length information of the predetermined time period;

monitor activity at the television equipment device to determine whether the user tunes to a different transmission channel before the predetermined time period has elapsed;

prevent access to the media asset when the user tunes to a different transmission channel before the predetermined time period has elapsed; and enable access to the media asset after the predetermined time period has elapsed.

* * * * *